(12) United States Patent
McCarthy et al.

(10) Patent No.: US 9,116,302 B2
(45) Date of Patent: Aug. 25, 2015

(54) OPTICAL METAPOLARIZER DEVICE

(75) Inventors: Wil McCarthy, Lakewood, CO (US); Richard M. Powers, Lakewood, CO (US); Wounjhang Park, Superior, CO (US)

(73) Assignee: RAVENBRICK LLC, Denver, CO (US)

(*) Notice: Subject to any disclaimer, the term of this patent is extended or adjusted under 35 U.S.C. 154(b) by 746 days.

(21) Appl. No.: 12/488,515

(22) Filed: Jun. 19, 2009

(65) Prior Publication Data

US 2010/0232017 A1  Sep. 16, 2010

Related U.S. Application Data

(60) Provisional application No. 61/074,095, filed on Jun. 19, 2008, provisional application No. 61/146,298, filed on Jan. 21, 2009.

(51) Int. Cl.
| | |
|---|---|
| *G02B 5/30* | (2006.01) |
| *B82Y 20/00* | (2011.01) |
| *G02B 1/00* | (2006.01) |
| *H01Q 15/00* | (2006.01) |

(52) U.S. Cl.
CPC ............ *G02B 5/3058* (2013.01); *B82Y 20/00* (2013.01); *G02B 1/007* (2013.01); *H01Q 15/0086* (2013.01)

(58) Field of Classification Search
CPC ... G02B 5/3058; G02B 5/3083; G02B 27/286
USPC ............. 359/483.01, 485.01, 485.05, 489.07; 343/700 MS
See application file for complete search history.

(56) References Cited

U.S. PATENT DOCUMENTS

| | | | | |
|---|---|---|---|---|
| 3,089,142 A | * | 5/1963 | Wickersham, Jr. | ........ 343/911 R |
| 3,436,143 A | * | 4/1969 | Garrett | ........... 359/352 |
| 3,754,271 A | * | 8/1973 | Epis | ................. 343/756 |
| 3,886,558 A | * | 5/1975 | Cary et al. | ..................... 343/708 |
| 3,990,784 A | | 11/1976 | Gelber | |
| 4,006,730 A | | 2/1977 | Clapham et al. | |
| 4,155,895 A | | 5/1979 | Rohowetz et al. | |
| 4,268,126 A | | 5/1981 | Mumford | |
| 4,387,377 A | * | 6/1983 | Kandler | ......................... 343/756 |
| 4,456,335 A | | 6/1984 | Mumford | |
| 4,475,031 A | | 10/1984 | Mockovciak, Jr. | |
| 4,479,128 A | * | 10/1984 | Brunner et al. | ............... 343/756 |

(Continued)

FOREIGN PATENT DOCUMENTS

| | | |
|---|---|---|
| CA | 2620005 A1 | 7/2008 |
| CN | 1350648 A | 5/2002 |

(Continued)

OTHER PUBLICATIONS

Fan et al., "Thin-film conducting microgrids as transparent heat mirrors," *Appl. Phys. Lett.* (Apr.5, 1976) 28(8):440-442.

(Continued)

*Primary Examiner* — Ricky D Shafer
(74) *Attorney, Agent, or Firm* — Dorsey & Whitney LLP

(57) ABSTRACT

An optical metapolarizer device polarizes light while mitigating the absorptive or reflective losses associated with traditional polarizers. The metapolarizer device transmits light of one polarity and rotates the other polarity so that it is closer to the transmitted polarity. As a result, although the light exiting the metapolarizer device is highly polarized, the total transmissivity of the device can be well in excess of 50%, and can approach 100% in the theoretical limit.

27 Claims, 17 Drawing Sheets

(56) References Cited

U.S. PATENT DOCUMENTS

| | | | |
|---|---|---|---|
| 4,491,390 A | 1/1985 | Tong-Shen | |
| 4,512,638 A | 4/1985 | Sriram et al. | |
| 4,579,638 A | 4/1986 | Scherber | |
| 4,640,583 A | 2/1987 | Hoshikawa et al. | |
| 4,641,922 A | 2/1987 | Jacob | |
| 4,688,900 A | 8/1987 | Doane et al. | |
| 4,688,901 A | 8/1987 | Albert | |
| 4,712,881 A * | 12/1987 | Shurtz et al. | 359/352 |
| 4,755,673 A | 7/1988 | Pollack et al. | |
| 4,756,758 A | 7/1988 | Lent et al. | |
| 4,783,150 A | 11/1988 | Tabony | |
| 4,786,914 A * | 11/1988 | Wu et al. | 343/909 |
| 4,789,500 A | 12/1988 | Morimoto et al. | |
| 4,804,254 A | 2/1989 | Doll et al. | |
| 4,848,875 A | 7/1989 | Baughman et al. | |
| 4,859,994 A | 8/1989 | Zola | |
| 4,871,220 A | 10/1989 | Kohin | |
| 4,877,675 A | 10/1989 | Falicoff et al. | |
| 4,893,902 A | 1/1990 | Baughman et al. | |
| 4,899,503 A | 2/1990 | Baughman et al. | |
| 4,964,251 A | 10/1990 | Baughman et al. | |
| 5,009,044 A | 4/1991 | Baughman et al. | |
| 5,013,918 A | 5/1991 | Choi | |
| 5,025,602 A | 6/1991 | Baughman et al. | |
| 5,111,629 A | 5/1992 | Baughman et al. | |
| 5,132,147 A | 7/1992 | Takiguchi | |
| 5,152,111 A | 10/1992 | Baughman et al. | |
| 5,193,900 A | 3/1993 | Yano et al. | |
| 5,196,705 A | 3/1993 | Ryan | |
| 5,197,242 A | 3/1993 | Baughman et al. | |
| 5,212,584 A | 5/1993 | Chung | |
| 5,227,115 A | 7/1993 | Harnischfeger | |
| 5,274,246 A | 12/1993 | Hopkins | |
| 5,304,323 A | 4/1994 | Arai et al. | |
| 5,308,706 A | 5/1994 | Kawaguchi et al. | |
| 5,319,478 A | 6/1994 | Funfschilling et al. | |
| 5,347,140 A | 9/1994 | Hirai | |
| 5,377,042 A | 12/1994 | Chahroudi | |
| 5,434,587 A * | 7/1995 | Hannan | 343/909 |
| 5,481,400 A | 1/1996 | Borden | |
| 5,525,430 A | 6/1996 | Chahroudi | |
| 5,530,263 A | 6/1996 | DiVincenzo | |
| 5,574,286 A | 11/1996 | Huston et al. | |
| 5,585,640 A | 12/1996 | Huston | |
| 5,757,828 A | 5/1998 | Ouchi | |
| 5,763,307 A | 6/1998 | Wang | |
| 5,881,200 A | 3/1999 | Burt | |
| 5,889,288 A | 3/1999 | Futatsugi | |
| 5,897,957 A | 4/1999 | Goodman | |
| 5,937,295 A | 8/1999 | Chen | |
| 5,940,150 A | 8/1999 | Faris et al. | |
| 6,040,859 A | 3/2000 | Takahashi | |
| 6,055,089 A | 4/2000 | Schulz et al. | |
| 6,099,758 A | 8/2000 | Verrall et al. | |
| 6,122,103 A | 9/2000 | Perkins et al. | |
| 6,208,463 B1 * | 3/2001 | Hansen et al. | 359/485.05 |
| 6,218,018 B1 | 4/2001 | McKown et al. | |
| 6,226,067 B1 | 5/2001 | Nishiguchi et al. | |
| 6,240,114 B1 | 5/2001 | Anselm | |
| 6,260,414 B1 | 7/2001 | Brown et al. | |
| 6,281,519 B1 | 8/2001 | Sugiyama et al. | |
| 6,288,840 B1 | 9/2001 | Perkins et al. | |
| 6,294,794 B1 | 9/2001 | Yoshimura et al. | |
| 6,304,784 B1 | 10/2001 | Allee | |
| 6,320,220 B1 | 11/2001 | Watanabe | |
| 6,329,668 B1 | 12/2001 | Razeghi | |
| 6,333,516 B1 | 12/2001 | Katoh | |
| 6,381,068 B1 | 4/2002 | Harada et al. | |
| 6,437,361 B1 | 8/2002 | Matsuda | |
| 6,446,402 B1 | 9/2002 | Byker | |
| 6,486,997 B1 | 11/2002 | Bruzzone et al. | |
| 6,487,112 B1 | 11/2002 | Wasshuber | |
| 6,493,482 B1 | 12/2002 | Al-hemyari et al. | |
| 6,498,354 B1 | 12/2002 | Jefferson | |
| 6,504,588 B1 | 1/2003 | Kaneko | |
| 6,512,242 B1 | 1/2003 | Fan et al. | |
| 6,559,903 B2 | 5/2003 | Faris et al. | |
| 6,583,827 B2 | 6/2003 | Faris et al. | |
| 6,600,169 B2 | 7/2003 | Stintz | |
| 6,611,640 B2 | 8/2003 | LoCasclo | |
| 6,635,898 B2 | 10/2003 | Williams et al. | |
| 6,661,022 B2 | 12/2003 | Morie | |
| 6,671,008 B1 | 12/2003 | Li et al. | |
| 6,710,823 B2 | 3/2004 | Faris et al. | |
| 6,718,086 B1 | 4/2004 | Ford | |
| 6,730,909 B2 | 5/2004 | Butler | |
| 6,753,273 B2 | 6/2004 | Holonyak, Jr. | |
| 6,770,916 B2 | 8/2004 | Ohshima | |
| 6,777,718 B2 | 8/2004 | Takagi | |
| 6,816,525 B2 | 11/2004 | Stintz | |
| 6,847,662 B2 | 1/2005 | Bouda | |
| 6,859,114 B2 * | 2/2005 | Eleftheriades et al. | 333/156 |
| 6,912,018 B2 | 6/2005 | Faris et al. | |
| 6,926,952 B1 | 8/2005 | Weber et al. | |
| 6,933,812 B2 * | 8/2005 | Sarabandi et al. | 333/219 |
| 6,946,697 B2 | 9/2005 | Pietambaram | |
| 6,963,435 B2 | 11/2005 | Mallya et al. | |
| 6,965,420 B2 | 11/2005 | Li et al. | |
| 6,978,070 B1 | 12/2005 | McCarthy et al. | |
| 6,985,291 B2 | 1/2006 | Watson | |
| 6,992,822 B2 | 1/2006 | Ma et al. | |
| 7,026,641 B2 | 4/2006 | Mohseni | |
| 7,038,745 B2 | 5/2006 | Weber et al. | |
| 7,042,615 B2 | 5/2006 | Richardson | |
| 7,046,441 B2 * | 5/2006 | Huang et al. | 359/485.05 |
| 7,068,234 B2 * | 6/2006 | Sievenpiper | 343/745 |
| 7,099,062 B2 | 8/2006 | Azens et al. | |
| 7,113,335 B2 | 9/2006 | Sales | |
| 7,154,451 B1 * | 12/2006 | Sievenpiper | 343/909 |
| 7,161,737 B2 | 1/2007 | Umeya | |
| 7,166,797 B1 | 1/2007 | Dziendziel et al. | |
| 7,221,827 B2 | 5/2007 | Domash et al. | |
| 7,245,431 B2 | 7/2007 | Watson et al. | |
| 7,276,432 B2 | 10/2007 | McCarthy et al. | |
| 7,300,167 B2 | 11/2007 | Fernando et al. | |
| 7,318,651 B2 | 1/2008 | Chua | |
| 7,351,346 B2 | 4/2008 | Little | |
| 7,385,659 B2 | 6/2008 | Kotchick et al. | |
| 7,470,925 B2 | 12/2008 | Tamura | |
| 7,522,124 B2 * | 4/2009 | Smith et al. | 343/909 |
| 7,532,397 B2 * | 5/2009 | Tanaka et al. | 359/485.02 |
| 7,538,946 B2 * | 5/2009 | Smith et al. | 359/569 |
| 7,561,332 B2 | 7/2009 | Little et al. | |
| 7,601,946 B2 | 10/2009 | Powers | |
| 7,619,816 B2 * | 11/2009 | Deng et al. | 359/484.01 |
| 7,629,569 B2 * | 12/2009 | Tharp et al. | 250/225 |
| 7,655,942 B2 | 2/2010 | McCarthy et al. | |
| 7,692,180 B2 | 4/2010 | Snyder et al. | |
| 7,911,563 B2 | 3/2011 | Hung | |
| 7,936,500 B2 | 5/2011 | Powers et al. | |
| 7,977,621 B2 | 7/2011 | McCarthy et al. | |
| 8,072,672 B2 | 12/2011 | Powers | |
| 8,076,661 B2 | 12/2011 | McCarthy et al. | |
| 8,169,685 B2 | 5/2012 | Powers | |
| 8,271,241 B2 * | 9/2012 | Akyurtlu et al. | 703/5 |
| 2002/0079485 A1 | 6/2002 | Stintz et al. | |
| 2002/0080842 A1 | 6/2002 | An | |
| 2002/0085151 A1 | 7/2002 | Faris et al. | |
| 2002/0114367 A1 | 8/2002 | Stintz et al. | |
| 2002/0118328 A1 | 8/2002 | Faris | |
| 2002/0141029 A1 | 10/2002 | Carlson | |
| 2002/0152191 A1 | 10/2002 | Hollenberg | |
| 2002/0180916 A1 | 12/2002 | Schadt et al. | |
| 2002/0190249 A1 | 12/2002 | Williams | |
| 2003/0052317 A1 | 3/2003 | Ohshima | |
| 2003/0059998 A1 | 3/2003 | Holonyak, Jr. | |
| 2003/0066998 A1 | 4/2003 | Lee | |
| 2003/0107813 A1 | 6/2003 | Clabburn et al. | |
| 2003/0107927 A1 | 6/2003 | Yerushalmi | |
| 2003/0129247 A1 | 7/2003 | Ju et al. | |
| 2003/0138209 A1 | 7/2003 | Chan | |
| 2003/0214632 A1 | 11/2003 | Aastuen | |
| 2003/0218712 A1 | 11/2003 | Kumar et al. | |
| 2003/0227663 A1 | 12/2003 | Agrawal | |

(56) References Cited

U.S. PATENT DOCUMENTS

| | | | |
|---|---|---|---|
| 2004/0005451 A1 | 1/2004 | Kretman et al. | |
| 2004/0012749 A1 | 1/2004 | Freeman | |
| 2004/0036993 A1 | 2/2004 | Tin | |
| 2004/0256612 A1 | 12/2004 | Mohseni | |
| 2005/0068629 A1 | 3/2005 | Fernando et al. | |
| 2005/0185125 A1 | 8/2005 | Miyachi | |
| 2005/0221128 A1 | 10/2005 | Kochergin | |
| 2005/0271092 A1 | 12/2005 | Ledentsov | |
| 2006/0011904 A1 | 1/2006 | Snyder et al. | |
| 2006/0147810 A1 | 7/2006 | Koch | |
| 2006/0151775 A1 | 7/2006 | Hollenberg | |
| 2006/0170901 A1 | 8/2006 | Tanitsu et al. | |
| 2006/0238867 A1 | 10/2006 | Takeda et al. | |
| 2006/0257090 A1* | 11/2006 | Podolskiy et al. | 385/129 |
| 2006/0262398 A1 | 11/2006 | Sangu et al. | |
| 2006/0274218 A1 | 12/2006 | Xue | |
| 2007/0070276 A1 | 3/2007 | Tan et al. | |
| 2007/0121034 A1 | 5/2007 | Ouderkirk | |
| 2007/0215843 A1 | 9/2007 | Soukoulis et al. | |
| 2007/0279727 A1 | 12/2007 | Gandhi et al. | |
| 2008/0008857 A1 | 1/2008 | Kalkanoglu et al. | |
| 2008/0013174 A1 | 1/2008 | Allen et al. | |
| 2008/0061222 A1 | 3/2008 | Powers et al. | |
| 2008/0117500 A1 | 5/2008 | Narendran et al. | |
| 2008/0138543 A1 | 6/2008 | Hoshino et al. | |
| 2008/0160321 A1 | 7/2008 | Padiyath et al. | |
| 2008/0204383 A1 | 8/2008 | McCarthy et al. | |
| 2008/0210893 A1 | 9/2008 | McCarthy et al. | |
| 2008/0246388 A1 | 10/2008 | Cheon | |
| 2008/0259254 A1 | 10/2008 | Kikuchi et al. | |
| 2009/0015902 A1 | 1/2009 | Powers et al. | |
| 2009/0040132 A1* | 2/2009 | Sridhar et al. | 343/911 R |
| 2009/0059406 A1 | 3/2009 | Powers et al. | |
| 2009/0128893 A1 | 5/2009 | McCarthy et al. | |
| 2009/0128907 A1 | 5/2009 | Takahashi et al. | |
| 2009/0167971 A1 | 7/2009 | Powers et al. | |
| 2009/0219603 A1 | 9/2009 | Xue | |
| 2009/0266394 A1 | 10/2009 | Tsubone | |
| 2009/0268273 A1 | 10/2009 | Powers et al. | |
| 2009/0296190 A1 | 12/2009 | Anderson et al. | |
| 2010/0001008 A1 | 1/2010 | McCarthy | |
| 2010/0015363 A1 | 1/2010 | Chiang et al. | |
| 2010/0027099 A1 | 2/2010 | McCarthy | |
| 2010/0045924 A1 | 2/2010 | Powers et al. | |
| 2010/0051898 A1 | 3/2010 | Kim, II | |
| 2010/0060844 A1 | 3/2010 | Sawatari et al. | |
| 2010/0118380 A1 | 5/2010 | Xue | |
| 2010/0232017 A1 | 9/2010 | McCarthy et al. | |
| 2010/0259698 A1 | 10/2010 | Powers et al. | |
| 2010/0271686 A1 | 10/2010 | Powers et al. | |
| 2010/0288947 A1 | 11/2010 | McCarthy et al. | |
| 2011/0025934 A1 | 2/2011 | McCarthy et al. | |
| 2011/0044061 A1 | 2/2011 | Santoro et al. | |
| 2011/0102878 A1 | 5/2011 | McCarthy et al. | |
| 2011/0205650 A1 | 8/2011 | Powers et al. | |
| 2011/0216254 A1 | 9/2011 | McCarthy et al. | |
| 2011/0234944 A1 | 9/2011 | Powers et al. | |
| 2011/0292488 A1 | 12/2011 | McCarthy et al. | |
| 2012/0140311 A1 | 6/2012 | Powers et al. | |
| 2012/0262773 A1 | 10/2012 | Powers et al. | |

FOREIGN PATENT DOCUMENTS

| | | |
|---|---|---|
| EP | 1162496 | 12/2001 |
| GB | 2261989 | 6/1993 |
| JP | 49-094145 | 6/1974 |
| JP | 58010717 | 1/1983 |
| JP | 59-231516 | 12/1984 |
| JP | 61223719 | 10/1986 |
| JP | 1178517 A | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-012818 | 1/2004 |
| JP | 2004-291345 | 10/2004 |
| JP | 2005-250119 | 9/2005 |
| JP | 2006-330108 | 7/2006 |
| JP | 2006-243485 | 9/2006 |
| JP | 2006-285242 | 10/2006 |
| JP | 2007-515661 | 6/2007 |
| JP | 2007-272016 | 10/2007 |
| JP | 2007-322902 | 12/2007 |
| JP | 2008-530766 | 8/2008 |
| JP | 2008-304618 | 12/2008 |
| JP | 2009-046742 | 3/2009 |
| KR | 10-2002-0013986 A | 2/2002 |
| KR | 2002-0044153 | 6/2002 |
| KR | 2003-0072578 | 9/2003 |
| KR | 10-2004-0046916 A | 6/2004 |
| KR | 10-2006-0000059 A | 1/2006 |
| KR | 10-2007-0091314 | 9/2007 |
| KR | 10-2010-0039401 | 4/2010 |
| WO | 94/02313 A1 | 2/1994 |
| WO | 97/01789 A2 | 1/1997 |
| WO | 01/23173 A1 | 4/2001 |
| WO | 02/064937 A1 | 8/2002 |
| WO | 03/029885 A1 | 4/2003 |
| WO | 03/096105 A1 | 11/2003 |
| WO | 2005/031437 A1 | 4/2005 |
| WO | 2005/076045 | 8/2005 |
| WO | 2006/023195 | 3/2006 |
| WO | 2006/036546 | 4/2006 |
| WO | 2006/088369 A2 | 8/2006 |
| WO | WO 2008/092038 | 7/2008 |
| WO | 2008/106596 A1 | 9/2008 |
| WO | 2008/144217 A1 | 11/2008 |

OTHER PUBLICATIONS

First Office Action dated Jan. 12, 2012, AU Application No. 2009300291, 2 pages.

Amendment and Response to First Office Action dated Jan. 20, 2012, AU Application No. 2009300291, 15 pages.

Second Office Action dated Feb. 13, 2012, AU Application No. 2009300291, 1 page.

First Office Action (with English translation) dated Dec. 15, 2011, CN Application No. 200980132227.9, 5 pages.

Response to First Office Action (English Summary) dated Jul. 2, 2012, CA Application No. 200980132227.9, 7 pages.

KR First Office Action (with English Summary) dated Mar. 29, 2012, KR Application No. 10-2011-7001257, 4 pages.

Hao, J. et al., "Manipulating Electromagnetic Wave Polarizations by Anisotropic Metamaterials," Physical Review Letters, 2007, vol. 99, No. 063908.

Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

(56) References Cited

OTHER PUBLICATIONS

Harrison, "Quantum Wells, Wires, and Dots: Theoretical & Computational Physics of Semiconductor Nanostructures" $2^{nd}$ Edition, John Wiley & Sons, LTD (2005), 3 pages.
Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.
Leatherdale, C.A., et al., "Photoconductivity in CdSe Quantum Dot Solids," Physical Review B, vol. 62, No. 4 (Jul. 15, 2000), pp. 2669-2680.
Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.
Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.
Padilla, W. J., "Electrically resonant terahertz metamaterials: Theoretical and experimental investigations" Physical Review B 75, 041102(R) (2007).
Rogacheva, A.V., et al., "Giant gyrotropy due to electromagnetic-field coupling in a bilayered chiral structure," Physical Review Letters 97, 177401 (Oct. 27, 2006).
Siegel, J. D., "The MSVD Low E 'Premium Performace' Myth," International Glass Review, Issue 1, 2002, pp. 55-58.
Zhang, W., "Giant optical activity in dielectric planar metamaterials with two-dimensional chirality," Journal of Optics A: Pure and Applied optics, 8, pp. 878-890 (2006).
Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.
Sarychev, A. K. et al., "Plasmonic Nanowire Metamaterials," in Negative-Refraction Metamaterials: Fundamental Principles and Applications, (Wiley 2005), pp. 313-337.
Author Unknown, Liquid Crystal Research, available at http://chirality.swarthmore.edu/LiqCrysRes/Description.htm, printed Aug. 21, 2009, pp. 1-8.
Barbagallo, S., Synthesis of Novel Metamaterials: A new Approach based on Planar Multilayered Frequency Selective Surface (VDM Verlag, Saarbrucken, Germany 2008), pp. 21, 38-39.
Eleftheriades, G. V. et al. (Editors), Iyers (Author), Negative-Refraction Melamaterials: Fundamental Principles and Applications, (Wiley 2005), pp. 4-5, 16-30, 321-330.
Extended European Search Report dated Mar. 27, 2013, EP Application No. 09818141.5, 12 pages.
Response to Second Office Action dated Jan. 16, 2013, AU Application No. 2009300291, 18 pages.
Third Office Action dated Feb. 8, 2013, AU Application No. 2009300291, 3 pages.
Response to Third Office Action dated Apr. 18, 2013, AU Application No. 2009300291, 12 pages.
Fourth Office Action dated May 7, 2013, AU Application No. 2009300291, 3 pages.
First Office Action dated Nov. 29, 2012, CA Application No. 2,754,556, 2 pages.
Response to First Office Action dated May 29, 2012, CA Application No. 2,754,556, 41 pages.
Second Office Action dated Dec. 3, 2012 (with English translation), CN Application No. 200980132227.9, 11 pages.
Response to Second Office Action dated Apr. 18, 2013 (with English summary), CN Application No. 200980132227.9, 16 pages.
Response to First Office Action dated Sep. 28, 2012 (with English Summary), KR Application No. 10-2011-7001257, 19 pages.
First Office Action dated Mar. 1, 2013 (with English translation), JP Application No. 2011-514878, 8 pages.
Korean Intellectual Property Office as International Searching Authority, International Search Report and Written Opinion for International Application No. PCT/US2009/048069, Apr. 23, 2010, 7 pages.
Korean Intellectual Property Office as International Searching Authority, International Search Report and Written Opinion for International Application No. PCT/US2009/003728, Apr. 23, 2010, 7 pages.
Dolling, G. et al., "Cut-wire pairs and plate pairs as magnetic atoms for optical metamaterials", Optics Letters, vol. 30, No. 23, Dec. 1, 2005, 3198-3200.
Response to Extended European Search Report dated Oct. 22, 2013, EP Application No. 09818141.5, 23 pages.
Response to First Office Action dated Sep. 12, 2013 (with English Summary), JP Application No. 2011-514878, 18 pages.
Notice of Intent to Grant, dated Oct. 7, 2014, EP Application No. 09818141.5, 52 pages.
Response to Patent Examination Report #4, dated Sep. 16, 2013, AU Application No. 2009300291, 18 pages.
Notice of Intent to Grant, dated Sep. 26, 2013, AU Application No. 2009300291, 3 pages.
Notice of Allowance, dated Jun. 28, 2013, CA Application No. 2,754,556, 1 page.
Notice of Issuance, dated May 6, 2013, CN Application No. 200980132227.9, 4 pages.
Final Decision of Refusal, dated May 6, 2013, JP Application No. 2011-514876, 4 pages.
Appeal Brief, dated Oct. 7, 2014, JP Application No. 2011-514878, 12 pages.

\* cited by examiner

OPTICAL METAPOLARIZER DEVICE

STATEMENT REGARDING FEDERALLY SPONSORED RESEARCH OR DEVELOPMENT

This technology was developed with sponsorship by the Defense Advanced Research Projects Agency Grant No. W31P4Q-08-C-0293 and the U.S. federal government has certain rights to this technology.

CROSS REFERENCE TO RELATED APPLICATIONS

This application is related to claims the benefit of priority pursuant to 35 U.S.C. §119(e) of U.S. provisional patent application Nos. 61/074,095 entitled "Optical metapolarizer device" filed 19 Jun. 2008 and 61/146,298 entitled "Optical metapolarizer device" filed 21 Jan. 2009, the disclosures of which are hereby incorporated herein by reference in their entireties.

BACKGROUND

1. Field of Technology

This technology relates to the polarization of light with less attenuation than normally associated with absorptive or reflective polarizers.

2. Description of the Related Art

The vast majority of liquid crystal devices in use around the world use absorptive polarizers, which attenuate slightly more than 50% of the light passing through them by absorption. Typically these are Polaroid films made, for example, from iodine-impregnated polymers stretched along one axis.

Wire-grid polarizers (WGPs) that reflect infrared light, rather than absorbing it, have been described since the 1960s, for example, in U.S. Pat. No. 4,512,638 to Sriram, et al. Such a device consists of a sub-wavelength scale array of closely spaced, parallel metal wires on a transparent substrate, such that light of one linear polarity that strikes the wires is reflected while light of opposite linear polarity is transmitted through the substrate. With the advent of nanoscale lithography in the 1990s and 2000s it became possible to produce broadband wire-grid polarizers that can polarize and reflect all the way up into visible and ultraviolet wavelengths for use with high-end optics, projective LCD video displays, and laser technology, as described for example in U.S. Pat. Nos. 6,122,103 and 6,288,840 to Perkins, et al.

More recently, low-cost reflective polarizer films combining the properties of a layered-polymer distributed Bragg reflector (DBR) with a stretched-polymer polarizer have been introduced. Such reflective polarizers are used in video displays to enhance brightness by recapturing, rather than absorbing, the attenuated light, as described for example in U.S. Pat. No. 7,038,745 to Weber, et al. and U.S. Pat. No. 6,099,758 to Verrall, et al. Such reflective polarizers can exhibit specular reflection, as in a mirror, or diffuse reflection, as in a coating of white paint, or a combination of the two.

In addition, reflective polarizers can be made from certain types of liquid crystals. Whereas wire-grid polarizers and stretched polymer polarizers are linearly polarizing, these liquid crystal polarizers (LCPs) are generally circularly polarizing. Thus, light of one circular polarization (i.e., right-handed or left-handed) is transmitted and light of the opposite circular polarization is absorbed or reflected.

Reflective polarizers of various types are a component of liquid-crystal-based video displays and thermoreflective optical filters. Typically these are linear rather than circular polarizers, as high contrast ratio and broad viewing angles may be more difficult to achieve using circular polarizers.

In addition, there are numerous examples of polarity-rotating materials, also known as "retarders" or "waveblocks" or "waveplates". In some cases these are structured devices such as twisted nematic liquid crystal cells or liquid crystal polymers, but more frequently they are simply birefringent materials, i.e., materials which exhibit a direction-dependent index of refraction. Such devices typically act across a range of wavelengths and, within that range, they operate equally on all polarities of light and act reversibly such that a photon passing through in one direction may be rotated clockwise whereas a photon passing through in the opposite direction may be rotated counterclockwise. In contrast, a "Faraday rotator" rotates the polarization of light in a non-reversible way. In other words, a photon passing through the Faraday rotator in one direction and then reflected back in the other direction experiences double rotation rather than net-zero rotation. However, even very efficient Faraday rotator materials such as terbium gallium garnet require strong magnetic fields and long optical paths in order to achieve meaningful rotation, making them impractical for most applications.

There are other examples of "metamaterials" or nanostructured materials incorporating sub-wavelength features that interfere with light waves in such a way that the metamaterial has an "effective permittivity" $\in_{\mathit{eff}}$, "effective permeability" $\mu_{\mathit{eff}}$ and "effective index of refraction" $n_{\mathit{eff}}$, and thus a "wave impedance"

$$Z = \sqrt{\frac{\varepsilon_{\mathit{eff}}}{\mu_{\mathit{eff}}}},$$

that are quite distinct from those of the substances from which the metamaterial is made. Depending on the structure of the device (particularly features with inductive and capacitive properties), these parameters can even be simultaneously negative—something that does not occur in natural materials. Thus, using metamaterials it is possible to construct devices that "violate" the "laws" of classical optics, including achieving resolutions significantly higher than classical diffraction limits and extending near-field features into the far field. However, metamaterials are generally transmissive only when $\in_{\mathit{eff}}$ and $\mu_{\mathit{eff}}$ have the same sign, i.e., "double positive" (alternatively "right-handed" or "positive index") and "double negative" (alternatively "left-handed" or "negative index") materials are transmissive to some degree, whereas "single positive" materials are opaque. One example of a device with such a metamaterial is a planar microwave antenna with negative $\in$ and $\mu$ based on a meander line or space-filling curve. See, Barbagallo, S., et al., "Synthesis of novel metamaterials," Chapter 2 (VDM Verlag 2008).

Other exemplary metamaterials are based on a transmission line topography periodically loaded with series capacitors and shunt inductors. See, Iyer, "Negative refraction metamaterials," Chapter 1, (Wiley 2005). This structure makes it possible to control $\in_{\mathit{eff}}$, $\mu_{\mathit{eff}}$, and $n_{\mathit{eff}}$ for positive, negative, or mixed values by adjusting the values of the capacitance and inductance of each periodic unit cell within the transmission line, and to adjust the wavelength range over which the device operates by adjusting the size of the unit cells. A "plasmonic nanowire composite metamaterials" is described that consistsdx of metallic nanowire segments distributed on or within a dielectric substrate, either randomly or periodically and either singly or in pairs See, "Negative refraction metamaterials," Chapter 8, Sarychev et al. (Wiley 2005). Depending on the length, diameter, concentration, and spacing of the wire segments, the $\in_{\mathit{eff}}$, $\mu_{\mathit{eff}}$, and $n_{\mathit{eff}}$ of the composite material can, for a given range of wavelengths, be adjusted to positive, negative, or mixed values.

Various planar, diagonally-symmetric "unit cells" or "particles" or "artificial atoms" that consist of planar arrangements of metal wire on a transparent dielectric substrate which, when arranged in regular 2-dimensional arrays, yield metamaterials with various properties including negative permittivity over certain ranges of wavelengths. See, Padilla, W. J., et al., "*Electrically resonant terahertz metamaterials: Theoretical and experimental investigations*" Physical Review B 75, 041102(R) (2007). These properties are dependent primarily on the size and spacing of the unit cells and secondarily on the shape of the unit cells. In general, the sizes of these unit cells fall between one-sixth and one-twentieth of the wavelengths they are intended to operate on.

Mismatched values of $\in_{\mathit{eff}}$ and $\mu_{\mathit{eff}}$ (i.e., where one parameter is close to that of free space while the other has a large positive or negative value) can rotate the polarity of a photon by shifting its electric and magnetic phases by different amounts. Thus, a metamaterial of this type can serve as a kind of waveblock, i.e., a device that rotates the polarity of photons within a particular wavelength range across a particular distance by a particular amount. These effects are frequency dependent, and various frequency responses can be arranged through design.

In addition, metamaterials can be designed for which the effective permittivity, permeability, and refractive index (and thus the overall optical properties) are different depending on the polarity of the incident light. One example of such a design is a chiral, planar structure consisting of "fish scale" patterns of aluminum nanowire on a transparent substrate. See, Fedotov, V. A., et al., "*Asymmetric propagation of electromagnetic waves through a planar chiral structure*," Physical Review Letters 97, 167401, (17 Oct. 2006). In essence, the structure is a type of wire grid polarizer, although it reflects and transmits circularly polarized light rather than linearly polarized light. Because its chiral nature is different depending on which surface of the polarizer is being observed, for light of mixed, random polarity (e.g., sunlight), this structure has an additional property of being asymmetrically transmissive, i.e., it is more transmissive to light passing through it in one direction than in the other.

Another example is a bi-layered metamaterial that is capable of altering (rotating) the azimuth of circularly polarized light in a manner comparable to a retarder or waveplate although in a much thinner structure. See, Rogacheva, A. V., et al., "*Giant gyrotropy due to electromagnetic-field coupling in a bilayered chiral sStructure*," Physical Review Letters 97, 177401 (27 Oct. 2006). A further example is a planar, chiral metamaterial that is capable of rotating the azimuth of circularly polarized light, in such a way that the degree of rotation depends on the input azimuth. See, Zhang, W., "*Giant optical activity in dielectric planar metamaterials with two-dimensional chirality*," Journal of Optics A: Pure and Applied optics, 8, pp. 878-90 (2006). Practical applications are not discussed for either device. Both are chiral and therefore non-axisymmetric, which limits their manufacturability. In addition, because they are chiral these structures act on circularly rather than linearly polarized light, which limits their potential utility in devices such as video displays and optical limiters for the reasons described above, i.e., because high contrast ratio and broad viewing angle are more difficult to achieve using circularly polarized light.

The information included in this Background section of the specification, including any references cited herein and any description or discussion thereof, is included for technical reference purposes only and is not to be regarded as subject matter by which the scope of the invention is to be bound.

SUMMARY

The reflective and absorptive polarizer types described above may be classified as polarity-sensitive metamaterials with positive $\in_{\mathit{eff}}$, $\mu_{\mathit{eff}}$, and $n_{\mathit{eff}}$, such that one polarity of light may be reflected or absorbed and an alternate polarity of light may be transmitted. The technology disclosed herein produces a structure that selectively rotates the polarity of photons of a given polarity, while having a much smaller effect on photons of opposite polarity.

In a traditional polarizer, whether absorptive or reflective, at least 50% of incoming light may be attenuated through interaction with the polarizer. This occurs because the incoming light from a typical light source consists of randomly polarized photons. The photons whose polarity is parallel to that of the polarizer are strongly transmitted through it with only mild reflection and/or absorption, and the photons of perpendicular polarity are weakly transmitted, and are strongly reflected and/or absorbed. Thus, in polarizing devices such as liquid crystal video displays, the total transmissivity of the device in its most transparent state is typically well under 50%, and often as low as 30%. The remainder of the light energy is reabsorbed within the device and ultimately dissipated as waste heat. Thus, the use of traditional polarizers places severe limitations on the brightness, energy efficiency, and total light flux of polarizing devices.

This assumes that the polarizer is approximately 100% efficient, which is a convenient, simplifying assumption for the purposes of this discussion. It should be understood that less efficient polarizers are possible, and that such polarizers may have greater than 50% transmissivity to unpolarized light, and may exhibit substantially less than 100% rejection of light with mismatched polarization. When used in video displays and optical filters, such polarizers may result in very low contrast ratios and may therefore be considered undesirable. Nevertheless, many commercially available polarizers may be significantly less than 100% efficient. In addition, many polarizers exhibit significant rejection of photons of matched polarity, which may result in lower total transmission even when the polarization efficiency is high. Nevertheless, for the purposes of this document we will continue to make the simplifying assumption that absorptive and reflective polarizers of all types are approximately 100% efficient and also approximately 100% transmissive to photons of matched polarization. This assumption may be familiar to practitioners of the art of liquid crystal displays and other polarizing optics.

Within this framework, a metamaterial, or nanoscale arrangement of metallic and dielectric materials is disclosed herein having effective parameters $\in_{\mathit{eff}}$, $\mu_{\mathit{eff}}$, and $n_{\mathit{eff}}$ that vary with the polarity of incident light such that light of one linear polarity is strongly transmitted and light of a perpendicular linear polarity is strongly rotated, such that its polarity more closely matches that of the transmitted light. For the purposes of this document, the resulting device shall be known as a "metapolarizer." Like a traditional polarizer, the metapolarizer may transmit only (or at least predominantly) light of a single polarity. However, unlike a traditional polarizer, the metapolarizer may not absorb or reflect a large percentage of the incident light in order to achieve this. As a result, the total transmissivity of the metapolarizer to unpolarized or randomly polarized incident light may be well in excess of 50%, and in fact may approach 100% in the theoretical limit, even when the polarization efficiency is also close to 100%

This technology has particular, but not exclusive, application as a replacement for traditional polarizers in video displays, liquid crystal optical shutters, and thermoabsorptive or thermoreflective optical attenuators (e.g., window films with temperature-dependent reflectivity and/or absorptivity). Implementations of this technology may be made in non-chiral forms to avoid introduction of ellipticity to the polarized light and therefore avoid inhibition in the contrast ratio of devices such as twisted nematic liquid crystal displays.

For the purposes of this document, the word "metallic" shall refer to any substance, material, structure or device with a high density of conduction electrons (including for example, a highly doped semiconductor, or the electron gas confined within a quantum well, quantum wire, or quantum dot), and the word "dielectric" shall refer to any substance, material, structure or device with a low or zero density of conduction electrons. The reader should note that this definition includes free space, which for the purposes of this document may be regarded as a dielectric medium. The word "metamaterial" shall refer to any artificial material constructed of metallic or dielectric features (whether randomly, periodically, or fractally distributed) on a dielectric substrate or within a dielectric medium, wherein the feature sizes are larger than natural atoms and significantly smaller than the wavelengths of light the material is designed to affect. The word "birefringent" shall refer to any material or structure which exhibits an index of refraction that varies with direction.

A metapolarizer, then, may be a metamaterial structure that forms both a polarity-specific waveblock and a polarity-rotating (as opposed to absorptive or reflective) polarizer. Light of one linear polarity passing through the medium may not be affected; light of the other linear polarity may be rotated toward the first polarity to some degree. Thus, while the transmissivity of an absorptive or reflective polarizer cannot exceed 50% (unless the polarization efficiency is substantially less than 100%), a metapolarizer is capable of transmissivities approaching 100%.

To accomplish this, the metamaterial may have the following characteristics:

1) Transparency to one polarity of light, i.e., $$Z_\| \approx Z_0$$

$$|\in_\|| \approx |\mu_\||,$$

wherein $\in_\|$ and $\mu_\|$ have the same sign (unless the metamaterial is thin enough to be optically translucent even if technically opaque), the imaginary component of $\in_\|$ is small, and $|n_\||$ is close to 1.0, and substantially less than 2.0, ergo $$\mu_\| \approx \mu_0 \text{ and } \in_\| \approx \in_0.$$

In other words, sections of the surface taken in the $\|$ direction may resemble a pure dielectric such as glass. Any inductive or capacitive features on the surface may be widely spaced, i.e., their spacing may be significantly more than ¼ the wavelength of the affected light.

2) Highly polarizing to the other polarity of light with minimal absorption or reflection, i.e., $$Z_\perp \ll \infty$$

$$|\in_\perp| > |\mu_\perp|$$

wherein $\in_\perp$ and $\mu_\perp$ have the same sign (unless the metamaterial is thin enough to be optically translucent even if technically opaque), the imaginary component of $\in_\perp$ is small, and $|n_\perp|$ is close to 1.0, and less than 2.0, thus $\mu_\perp$=small number, and $\in_\perp$=large number.

In other words, sections of the surface taken in the $\perp$ direction may resemble a highly capacitive, low-induction structure, with features spaced within ⅙ wavelength or less to allow for significant capacitive coupling.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

Please note that closely related elements have equivalent element numbers many of the figures.

DETAILED DESCRIPTION

Metamaterials as disclosed herein with effective permittivity and permeability ($\in_{eff}$ and $\mu_{eff}$) in either a double-positive (DPS), single-negative (SNG), or double-negative (DNG) state, may be employed in such a way that the permittivity and permeability may differ for different polarities of light. For example, for one linear polarity of incident light, $\in_{eff}$ and $\mu_{eff}$ may be such that the metamaterial is largely transmissive, with minimal reflection, absorption, or phase shifting. For the perpendicular polarity of incident light, $\in_{eff}$ and $\mu_{eff}$ may be such that the metamaterial remains largely transmissive with minimal reflection and absorption, but with a substantial phase-shifting effect that alters the relative phase of electric and magnetic fields of a photon, such that the polarity of the photon may be rotated. Thus, the metamaterial device may act as a metapolarizer, i.e., the light exiting the device may be entirely or largely composed of a single polarity, but of an intensity generally greater than 50% of the intensity of unpolarized or randomly polarized light incident on the device. In the theoretical extreme, the transmissivity of the device may approach 100%.

Figure 1:
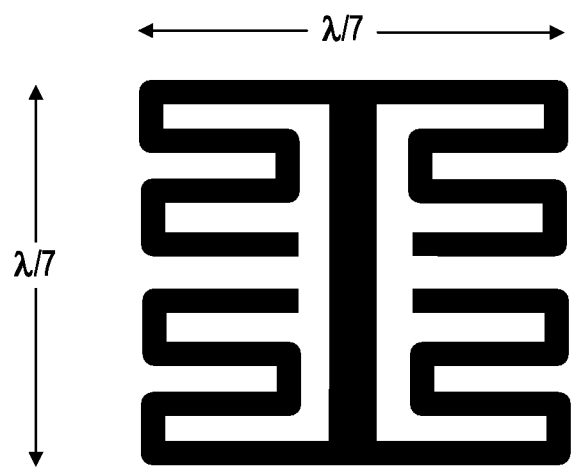
FIG. 1 is from the prior art and is a schematic view of a negative-index microwave antenna. This antenna offers a good compromise between small electrical size and wide bandwidth for low resonant frequencies, along with low cross-polarization (i.e., it is responsive only to one polarization). The size may be approximately $\frac{1}{7}^{th}$ of the first resonant frequency.

FIG. 1 is from the prior art, and is a schematic view of a negative-index microwave antenna disclosed in Chapter 2 of "Synthesis of Novel Metamaterials" (S. Barbagallo, VDM Verlag, 2008). The structure is a planar "meander line" or "fractal" or "space filling curve" microwave antenna with negative $\in$ and $\mu$, which responds predominantly to one polarization of radiation while having little effect on the other polarization. The antenna also has a much greater effect on the electric field of the wave than on the magnetic field of the wave. As a result, although this structure is intended for use as an antenna and is not disclosed, described, or employed as a metapolarizer, when electrically isolated in free space or on a dielectric substrate it has many attributes that may be desirable for a metapolarizer. As described, the device operates only in microwave frequencies.

Figure 2:
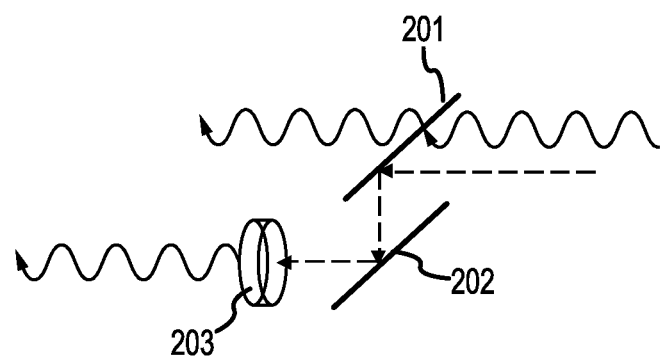
FIG. 2 is from the prior art and is a schematic view of a lossy, polarity-rotating polarizer incorporating only classical components.

FIG. 2 was previously presented in U.S. Patent Application Publication No. 2009/0015902 to Powers et al., and is a schematic representation of an exemplary form of a polarity-rotating polarizer device, incorporating only classical optical elements. The device may consist of a reflective polarizer 201, a mirror 202, and a depolarizer (waveblock) 203. When light of matching polarity strikes the polarizer 201, it may be transmitted through. However, when light of opposite polarity strikes the polarizer 201, it may be reflected at a 45-degree angle to the mirror 202, which may also reflect it at a 45-degree angle such that the light is traveling once again in or close to its original direction. At this point, the reflected light may pass through a permanent depolarizer 203 (also known as a retarder, waveblock or waveplate) that rotates its polarity by a specific amount (e.g., 90 degrees). Thus, the polarity of the reflected light now matches the polarity of the transmitted light. Therefore, the polarity-rotating polarizer transmits approximately 100% of the light that strikes it, while ensuring that all of the light is of the same polarization. Unfortunately, because the mirror 202 blocks the transmission of light from directly behind it, the overall transmissivity of this structure, like that of a standard polarizer, may be no greater than 50%.

Figure 3:
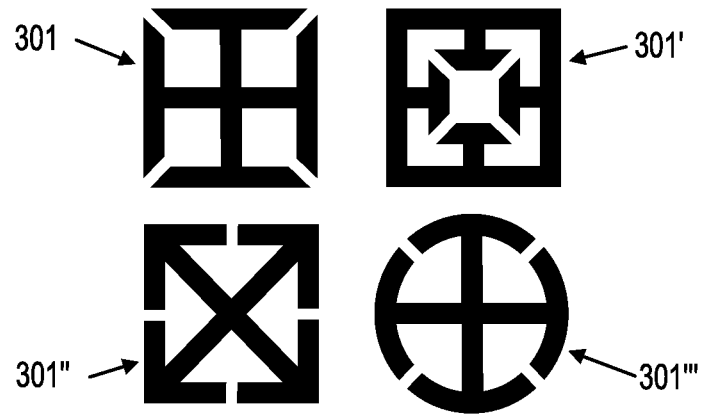
FIG. 3 is from the prior art and is a schematic view of four different planar metamaterial unit cells that are capable of exhibiting a negative $\in$ and that exhibit vertical, horizontal, and diagonal symmetry. The unit cell size may be between approximately $\frac{1}{7}^{th}$ and $\frac{1}{10}^{th}$ of the resonant wavelength.

FIG. 3 is from the prior art (Padilla et. al: "*Electrically resonant terahertz metamaterials: Theoretical and experimental investigations*," Physical Review B 75, 041102(R) (2007)), and is a schematic view of four different planar metamaterial unit cells that may exhibit vertical, horizontal, and diagonal symmetry. Padilla discloses that because of the symmetry these unit cells may be highly capacitive but may exhibit little or no inductance. Padilla further discloses that with unit cell sizes between approximately $\frac{1}{7}^{th}$ and $\frac{1}{10}^{th}$ of the resonant wavelength, and spacing of between approximately $\frac{1}{5}^{th}$ and $\frac{1}{7}^{th}$ of the resonant wavelength, regular planar arrays of these unit cells may yield metamaterials with negative $\in_{eff}$ at wavelengths slightly shorter than the resonant wavelength, and with $\mu_{eff}$ that may be largely unaffected by the unit cell structure or spacing. Thus, even with a fixed array spacing and unit cell size, the shape of the unit cells may be altered to yield different values of $n_{eff}$ for a given range of wavelengths, and thus different optical properties for the metamaterial. These unit cells are shown here for exemplary purposes only. Furthermore, the metamaterials disclosed by Padilla et al. act equally on all polarizations of light and are therefore not capable of serving as metapolarizers.

Figure 4:
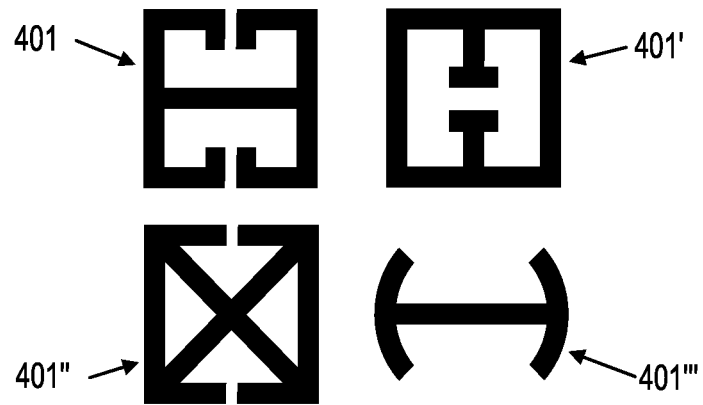
FIG. 4 is a schematic view of four planar metamaterial unit cells, modified from the versions in FIG. 3 such that are capable of exhibiting a negative $\in$ and that exhibit vertical and horizontal symmetry but not diagonal symmetry.

FIG. 4 is a schematic view of four planar metamaterial unit cells, modified from the versions in FIG. 3. These unit cells are capable of exhibiting a negative E and may exhibit vertical and horizontal symmetry but not diagonal symmetry. These structures are adapted from examples in Padilla et. al., and because they lack diagonal symmetry they are capable of producing non-isotropic effects and/or polarity-sensitive or polarity-specific effects. This breaking of diagonal symmetry may increase the inductance of the unit cells and thus the $\mu_{eff}$ of a metamaterial made from a planar array of such unit cells. Thus, even for a fixed array spacing and unit cell size, $\mu_{eff}$ may be adjusted along with $\in_{eff}$ through design of the shape of the unit cells, to yield planar metamaterials with tailored electrical and magnetic properties. These unit cells are shown here for exemplary purposes only and should not be regarded as limiting the scope of the present invention.

Figure 5:
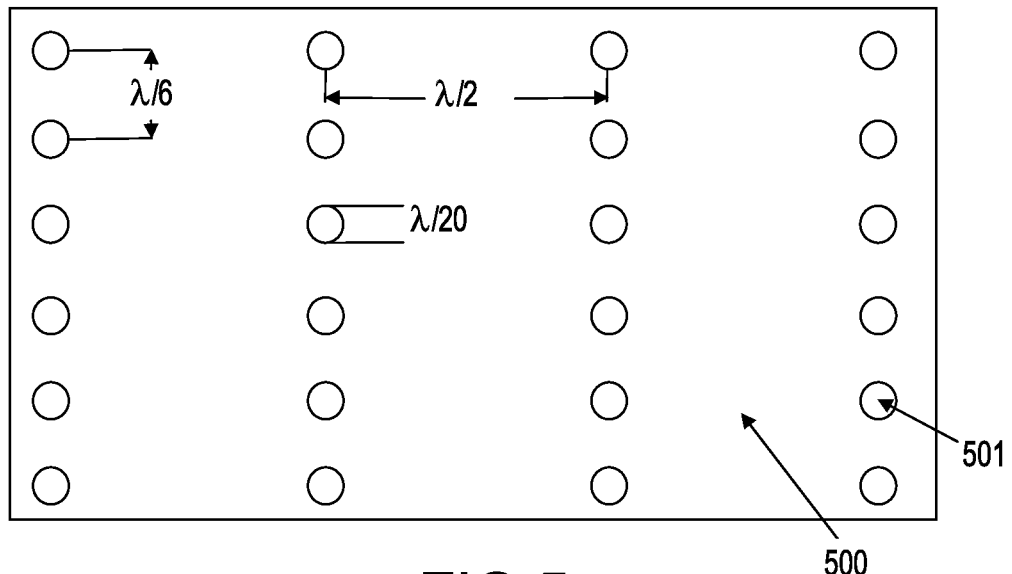
FIG. 5 is a schematic representation of another exemplary embodiment of a metapolarizer in the form of a planar array of carefully spaced metal dots on a dielectric substrate.

FIG. 5 is a schematic, top plan view of one embodiment of a metapolarizer composed of an array of carefully spaced metallic dots 501 on a dielectric substrate 500. Generally speaking, metal dots on a dielectric surface may be electrically isolated and capable of storing a significant excess charge or having a time-varying charge distribution. This arrangement may make the metal dots highly capacitive, which may tend to increase the absolute value of the effective permittivity, and decrease or leave alone the absolute value of effective permeability. Large permittivity and small permeability may also yield a low impedance, which may minimize reflectivity, and yield a larger phase shift to the electrical component of a photon passing perpendicularly through the surface than to the photon's magnetic component, thus rotating the photon's polarity.

If the dots are regularly spaced in a symmetrical grid, this effect may apply equally to incoming photons of any polarity. However, if the dots are instead arranged into rows and columns, where an exemplary spacing between columns may be approximately half the affected wavelength (e.g., 275 nm for green light in the middle of the visible spectrum), and an exemplary spacing between dots within a column may be much smaller—roughly one-sixth of the affected wavelength (or 92 nm for green light) or less—the dots may effect the phase of incoming photons of only a particular incoming polarity. The diameter of the dots may be smaller still, roughly one-twentieth of a wavelength (27.5 nm for green light), so that they may cover less than one tenth of the total surface area of the device and may therefore not be a significant source of attenuation for the light passing through the device.

When a photon of one linear polarity, traveling perpendicular to the plane of the dot array, interacts with this structure, it may "see" a larger number of dots and therefore a high permittivity and high phase shift to its electrical component. When a photon of opposite (i.e., perpendicular) linear polarity interacts, it may "see" a smaller number of dots and therefore a smaller permittivity and a smaller phase shift.

The effective permittivity, permeability, and refractive index of this structure may all be positive. However, the structure may be given a negative refractive index by placing an optional continuous wire (not pictured) above, below, or adjacent to each column of dots to serve as a ground plane (or ground wire in the transmission line analogy) or as a literal source of inductive coupling. Alternatively or in addition, the metal dots may be replaced with other types of metamaterial unit cells including, but not limited to the exemplary forms shown in FIG. 3, which may be vertically, horizontally, and diagonally symmetric and may therefore be predominantly capacitive in nature. Although the unit cells themselves are not sensitive to the polarization of an incoming photon, the overall structure responds differently to parallel and perpendicular polarizations because of the anisotropy in the unit cell spacing.

In either case, as in the embodiment shown in FIG. 5, because of the asymmetry in the 2-dimensional array, the multiplicity of unit cells may rotate one polarity of light significantly more than the other polarity of light and may thus serve as a metapolarizer. Thus, the structure may be employed, for example, to reduce the ~50% polarizer-related energy losses in a liquid crystal video display.

Figure 6:
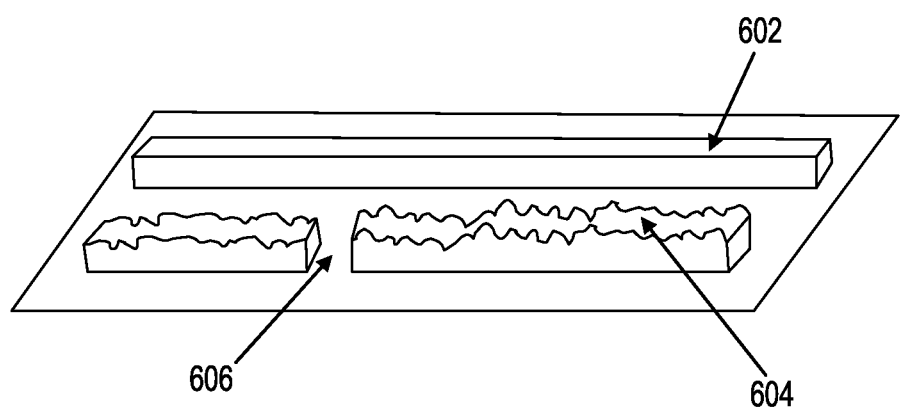
FIG. 6 is a schematic top plan view of a smooth wire and a roughened wire incorporating a capacitive gap for use in embodiments of a metapolarizer.

FIG. 6 is an isometric view of two wires in an optical device, such as a wire grid polarizer. However, two different wire types are shown here for exemplary purposes. When placed in parallel at regular spacing, a multiplicity of smooth rectangular wires 602 may produce a wire grid polarizer, i.e., a reflective linear polarizer that transmits light of a matching polarity and reflects light of perpendicular polarity. Also, for wavelengths of light that are larger than the wire spacing and for photons of the reflected polarity, the smooth wires 602 may behave very much like a flat, solid metal film. Reflection from the polarizer surface may therefore be specular, resulting in a clear, mirror-like appearance.

However, when irregular wires 604 having either or both small- and large-scale features (relative to the wavelength of light) are used instead, the "surface" of the polarizer as "seen" by photons of the appropriate wavelength and polarity may appear irregular rather than smooth; both small- and large-scale features (relative to the wavelength of light) are applicable. Since specular reflection typically requires a microscopically smooth surface, while reflection from irregular surfaces is typically diffusive, the reflected light from such a polarizer may have a white or metallic gray appearance, rather than a mirrored one. Since a certain amount of reflection may be inevitable in almost any metal-dielectric structure, including metamaterials, it may be desirable to control the properties of the reflection. Thus, a metamaterial fashioned from irregular wires 604 may create diffuse rather than specular reflections, which may be desirable for applications in optical shutters, "smart window" devices, and video displays.

Also, because many wavelength-dependent optical parameters of a metamaterial may relate directly or indirectly to the diameter of the metal elements used to create it, and because irregular wires have diameters that vary with position along the wire, the bandwidth of a metamaterial (i.e., the range of wavelengths over which it responds) may be broadened by fashioning it from irregular rather than regular metallic elements.

In addition, placing sub-wavelength-sized breaks or gaps 606 within the smooth wires 602 or irregular wires 604 may increase the series capacitance of the wire 604. Since the effective permittivity $\in_{eff}$ of a structure is proportional to its series capacitance, and the effective permeability $\mu_{eff}$ is proportional to the inverse of series capacitance, the placement and sizing of these capacitive gaps may have a profound effect on the optical properties of the resulting metamaterial. Thus, it should be understood that irregular features and/or capacitive gaps may be added to any of the metamaterial structures described in this document to fine-tune their optical properties.

Figure 7:
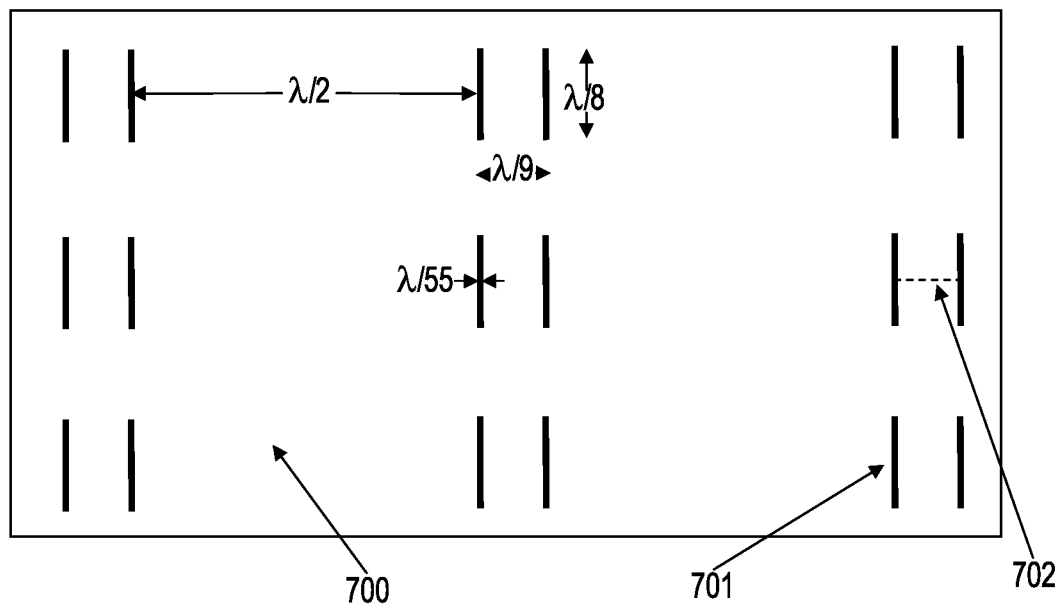
FIG. 7 is a schematic top plan view of another exemplary embodiment of a metapolarizer in the form of a planar array of carefully sized and spaced wire pairs.

FIG. 7 is a schematic, top plan view of another embodiment of a metapolarizer wherein the effective permittivity and permeability are controlled by parallel pairs of nanowire segments 701 on a dielectric substrate 700. The effective permittivity $\in_{eff}$ and effective permeability $\mu_{eff}$ are dependent mainly on the length and diameter of the individual nanowire segments, which act as antennas and thus have a profound effect on the structure's electromagnetic response at certain resonant wavelengths. For a given wavelength $\lambda$, a wire length of approximately $\lambda/8$ or greater, and an aspect ratio of approximately 6.875:1 (length=44 nm and diameter=6.3 nm, respectively for violet light at $\lambda$=350 nm) yields a strong negative permittivity at wavelengths of $\lambda$ or greater. However, for the same wire length, the magnitude of $\mu_{eff}$ peaks at a wavelength approximately 30% shorter than $\lambda$, and decays asymptotically to the permittivity of free space as the wavelength increases. Unlike the metal dots shown in FIG. 5, unit cells consisting of parallel wire pairs 701 may exhibit vertical and horizontal symmetry, but not diagonal symmetry, and may therefore have significant inductance as well as capacitance.

Thus, at wavelength $\lambda$, the wire pair 701 yields a large negative permittivity and a small negative permeability—the conditions already identified for a polarity-rotating effect. In addition, as in FIG. 5, the metamaterial features of this embodiment are spaced in columns, wherein the spacing of elements within a column is significantly smaller than the spacing between the columns themselves. Thus, light of one linear polarity encounters a large number of wire pairs and therefore a large rotation, while light of the perpendicular polarity encounters a smaller number of wire pairs and therefore a smaller rotation. As a result, light of one polarity is strongly rotated with respect to the other, i.e. the structure is a metapolarizer.

The effective permittivity and permeability created by the wire pairs is also strongly dependent on their concentration, i.e., the number of wire pairs in a given volume of space. However, while the exact spacing between the wires in a pair affects their resonant properties and therefore the degree of polarity rotation, the device can tolerate a large range of spacings without fundamentally changing the way it operates. The ideal value is suspected to be approximately $\lambda/9$, as shown in the figure, although we do not wish to be bound by this as values from $\lambda/20$ to $\lambda/4$ have been shown to work, and many values outside this range are suspected to produce metapolarizing effects as well.

Somewhat counterintuitively, the performance of the metamaterial may not be strongly dependent on the orientation or "clock angle" of the wire pairs 701 on the dielectric substrate 700, although the classical polarizing properties of the wires may be compromised if their clock angles vary significantly. In an alternative, functionally equivalent explanation, the resonant vibration modes for electrons in diagonally symmetric structures may also be symmetric (i.e., with all resonant electrons moving in parallel), whereas for diagonally asymmetric or antisymmetric unit cells the electrons in different parts of the structure may be moving asymmetrically or antisymmetrically. When electrons in a wire are moving in one direction and electrons in a neighboring, parallel or approximately parallel wire are moving in an opposite or approximately opposite direction, this resonance may "look" like a circulating current to an "observer" (e.g., an incident photon) and thus produce a magnetic field capable of altering the $\mu_{\mathit{eff}}$ of the metamaterial, just as the electric field surrounding a unit cell may alter the $\in_{\mathit{eff}}$ of the metamaterial.

In a third, functionally equivalent explanation, the two parallel (or approximately parallel) wires 701 may form a literal transmission line with each wire serving as the ground for the other and with a dielectric substrate (e.g., free space) at each end serving as both the source and the load. These analogies are provided for explanatory purposes only and should not be regarded as limiting the scope of any embodiment of a metapolarizer device that exploits these principles of metamaterials.

In the embodiment of FIG. 7, the effective permittivity $\in_{\mathit{eff}}$ and effective permeability $\mu_{\mathit{eff}}$ may be dependent primarily on the length and diameter of the individual nanowire segments, which act as transmission lines and thus have a profound effect on the electromagnetic response of the metapolarizer at certain resonant wavelengths. For example, for a given wavelength $\lambda$, a wire length of approximately $\lambda/8$ or greater, and an aspect ratio of approximately 6.875:1 (length=44 nm and diameter=6.3 nm, respectively for green light at $\lambda$=350 nm) may yield a strong negative permittivity at wavelengths of $\lambda$ or greater. However, for the same wire length, the magnitude of $\mu_{\mathit{eff}}$ may peak at a wavelength approximately 30% shorter than $\lambda$, and may decay asymptotically to the permittivity of free space as the wavelength increases.

Thus, at wavelength $\lambda$, the wire pair 701 may yield a large negative permittivity and a small negative permeability—some of the conditions already identified for a polarity-rotating effect. In the degenerate case where the wire pairs 701 are distributed on the substrate 700 in a symmetrically periodic array (e.g., where the horizontal space between unit cells is identical to the space between wires within a unit cell and the vertical space between unit cells is identical to the length of the wires within a unit cell), this effect may apply equally to photons of either linear polarity and thus no metapolarizing effect may occur. However, as in FIG. 5, the metamaterial features of this embodiment may be spaced in columns, wherein the spacing of elements within a column is significantly smaller than the spacing between the columns themselves. Thus, light of one linear polarity may encounter a large number of wire pairs 701 and therefore a large rotation, while light of the perpendicular polarity may encounter a smaller number of wire pairs and therefore a smaller rotation. As a result, light of one polarity may be strongly rotated with respect to the other, and thus the structure may serve as a metapolarizer.

The effective permittivity and permeability created by the wire pairs 701 may also be strongly dependent on the concentration of wire pairs 701, i.e., the number of wire pairs 701 in a given volume of space. However, while the exact spacing between the wires in a pair 701 affects the resonant properties of the wire pair 701 and therefore the degree of polarity rotation, the device may tolerate a large range of spacings without fundamentally changing the way it operates. The ideal value is suspected to be approximately $\lambda/9$, as shown in the figure, although we do not wish to be bound by this as values from $\lambda/20$ to $\lambda/4$ have been shown to work, and many values outside this range are suspected to produce metapolarizing effects as well.

Somewhat counterintuitively, the performance of the metamaterial may not be strongly dependent on the orientation or "clock angle" of the wire pairs 701 on the dielectric substrate 700, although the classical polarizing properties of the wire pairs 701 will be compromised if their clock angles vary significantly. Similarly, the principal function of the metamaterial may not be strongly dependent on the vertical spacing between wire pairs 701 within a column, except to the extent that this affects the total concentration of wire pairs 701 on the substrate and the relative concentration of columns vs. rows that gives rise to the metapolarizer effect. Changes in these values may affect the exact amount of rotation that photons of each polarity are subjected to, with the extreme of zero concentration resulting in zero rotation.

If the concentration of wire pairs 701 is larger than a threshold value, and therefore the spacing of wire pairs 701 within a column is smaller than a threshold value, then capacitive and inductive coupling between the wire pairs will create interference that disrupts the normal function and thus radically alter the electromagnetic response of the metamaterial. The $\lambda/8$ spacing shown in the figure is within the functional range of the metapolarizer device, which is believed to extend from $\lambda/0$ (i.e., infinity, a degenerate case) to approximately $\lambda/20$.

In the degenerate case where the spacing within a column is zero and the spacing between columns equals the spacing between nanowire segments within a wire pair 701, the device may become a classical wire grid polarizer that has no metapolarizing effects.

An optional shunt inductor 702 may be added between the wires of a wire pair 701 in order to increase the inductance of the wire pair and thus tune the $\in_{\mathit{eff}}$ and $\mu_{\mathit{eff}}$ of the metamaterial as an alternative to, or in combination with, altering the length, diameter, and spacing of the nanowire segments. Alternatively, the wire pairs 701 may be replaced with other types of unit cells (including but not limited to the types shown in FIG. 4), which may exhibit vertical and horizontal symmetry but not diagonal symmetry. As previously discussed, the exact shape of such unit cells may allow precise control over both capacitance and inductance, even when the spacing between unit cells is fixed, and thus have an effect on both the $\in_{\mathit{eff}}$ and $\mu_{\mathit{eff}}$ of the metamaterial.

In addition, the $\in_{\mathit{eff}}$ and $\mu_{\mathit{eff}}$ of the metamaterial may be adjusted precisely through the addition, deletion, or distortion of a variety of features within each unit cell, as demonstrated for example by the unit cells depicted in FIG. 4. Because those unit cells, like the wire pairs 701 (with or without shunt inductors 702), lack diagonal symmetry, they exhibit different responses to photons of parallel and perpendicular polarity. Thus, for this embodiment, the metapolarizing effect arises both from anisotropy in the unit cell spacing and from anisotropy within the unit cells themselves.

Figure 8:
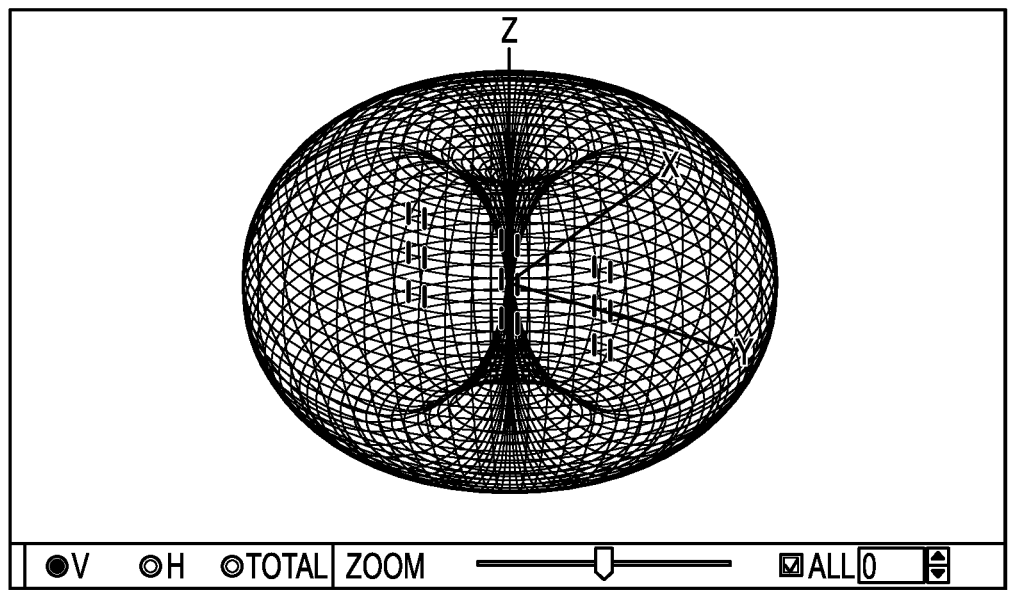
FIG. 8 is a 3-dimensional plot of the classical antenna-like behavior of the embodiment of FIG. 7 for the vertical polarization.

FIG. 8 is a 3-dimensional plot of the classical, antenna-like behavior of the embodiment of FIG. 7 for the vertical polarization. Although this embodiment is not an antenna per se, and is not intended to absorb or emit large amounts of radiation but rather to alter the behavior of the radiation passing through it, there may still be diagnostic value in applying a fictional voltage pulse to the structure and examining the resulting emission pattern. As the plot shows, the emission is highly symmetrical and omnidirectional, indicating that the response of the metamaterial for this polarization is strong, and may not be highly dependent on incidence angle except where the radiation is very nearly parallel to the nanowires within the structure.

Figure 9:
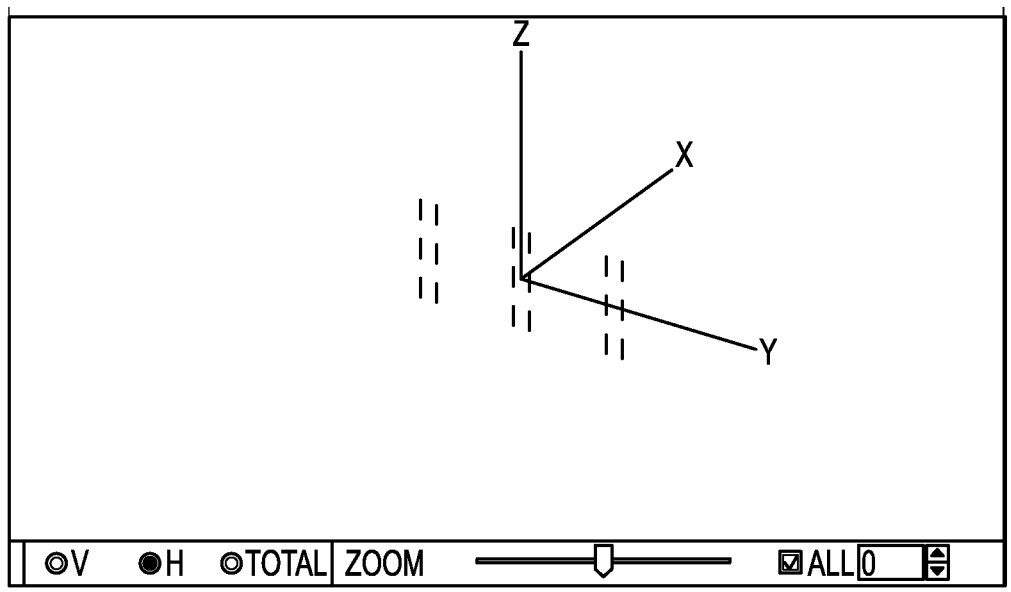
FIG. 9 is a 3-dimensional plot of the classical antenna-like behavior of the embodiment of FIG. 7 for the horizontal polarization.

FIG. 9 is a 3-dimensional plot of the classical, antenna-like behavior of the embodiment of FIG. 7 for the horizontal polarization. As the plot shows, the theoretical response of the metamaterial for this polarization may be zero, meaning photons of this polarization may not interact with the metamaterial at all. Due to misalignments and defects in a real-world device, the actual response may generally be nonzero, though small enough to be negligible in many circumstances.

Figure 10:
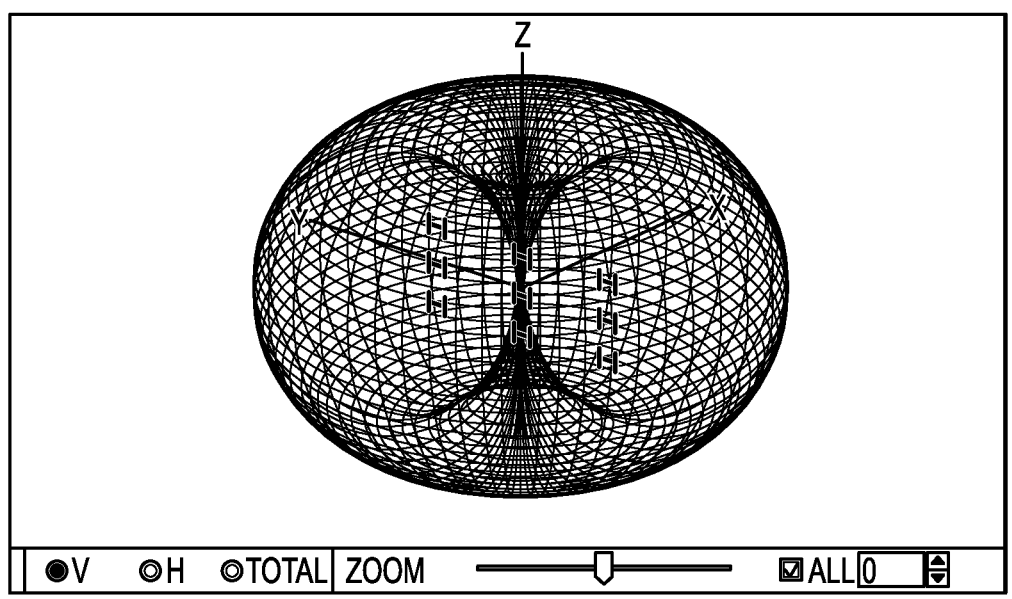
FIG. 10 is a 3-dimensional plot of the classical antenna-like behavior of the embodiment of FIG. 7 with optional inductive shunts for the vertical polarization.

FIG. 10 is a 3-dimensional plot of the classical, antenna-like behavior of the embodiment of FIG. 7 with the optional inductive shunts 702, for the vertical polarization. As in FIG. 8, the response is highly symmetrical and omnidirectional, indicating that the response of the metamaterial for this polarization may be strong, and may not be highly dependent on incidence angle.

Figure 11:
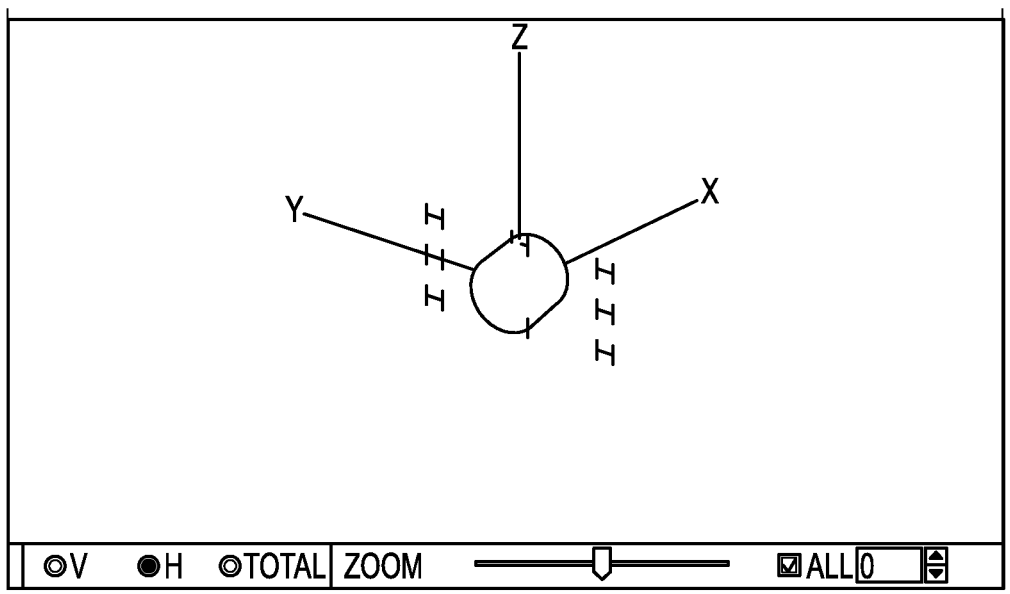
FIG. 11 is a 3-dimensional plot of the classical antenna-like behavior of the embodiment of FIG. 7 with optional inductive shunts for the horizontal polarization.
Figure 12A:
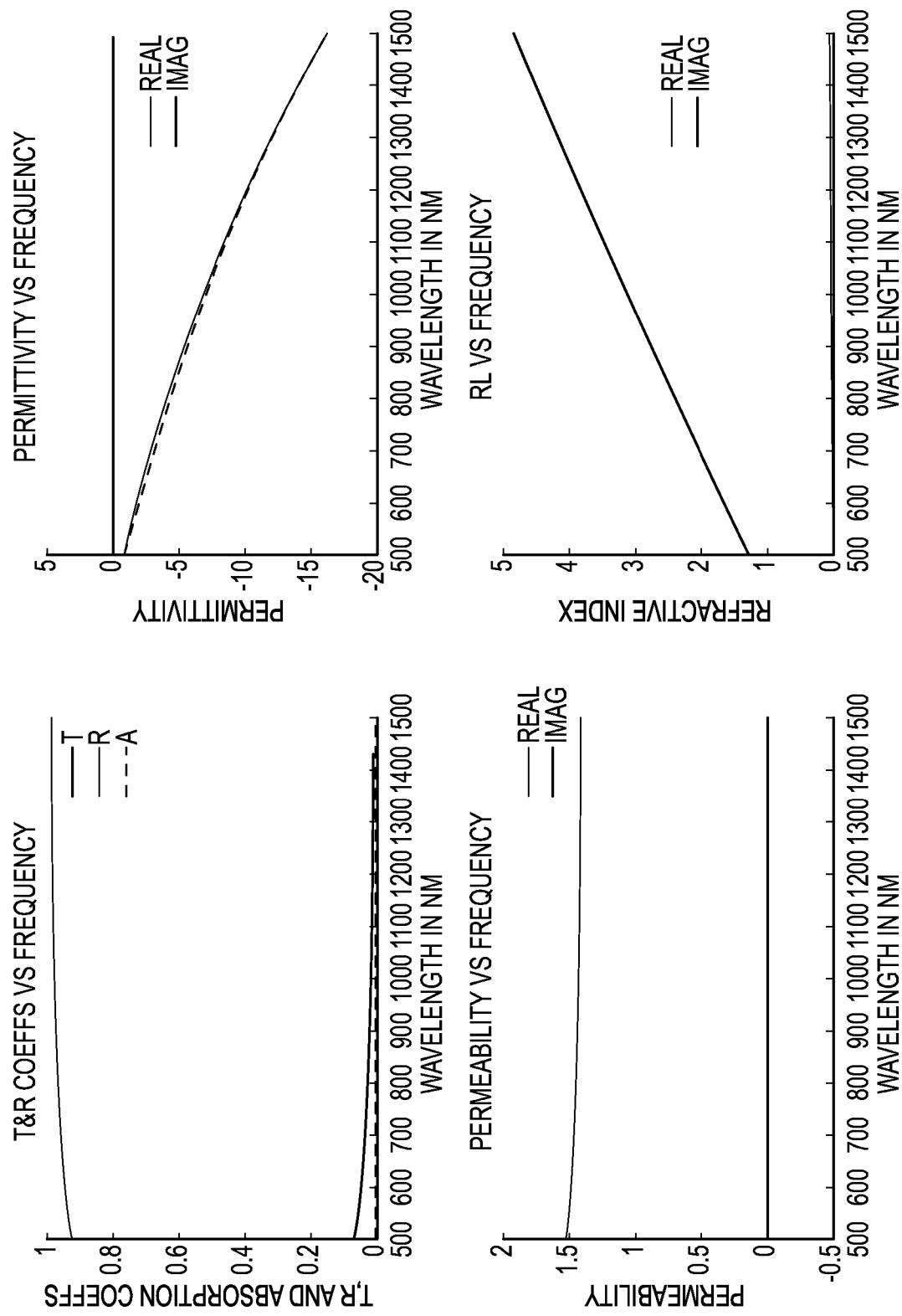
FIGS. 12A-D are a series of 2-dimensional plots showing the effective parameters $\in_{\it eff}$, $\mu_{\it eff}$, and $n_{\it eff}$ for both the electric and magnetic fields of an incident photon for each polarization of light.
Figure 12B:
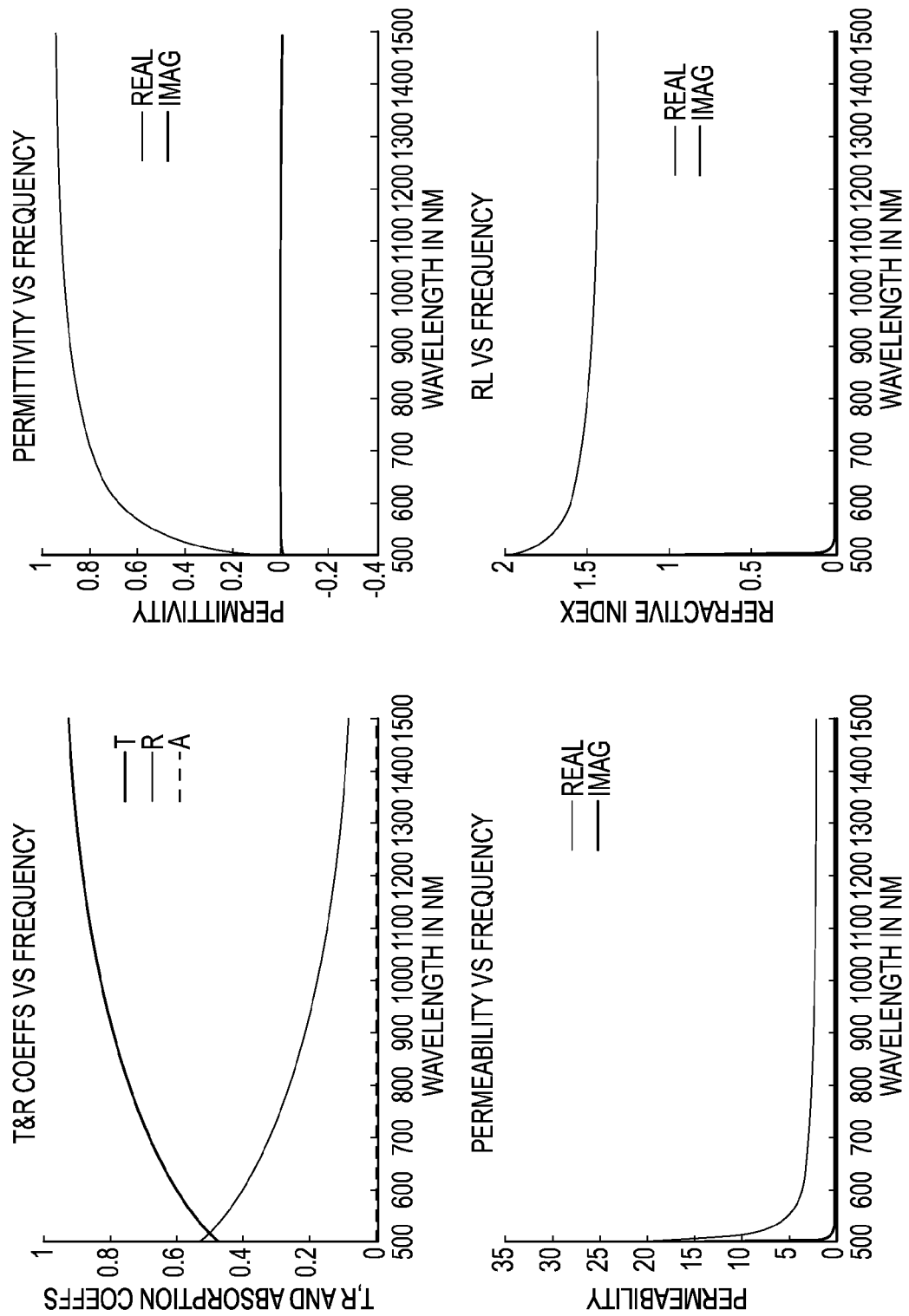
Figure 12C:
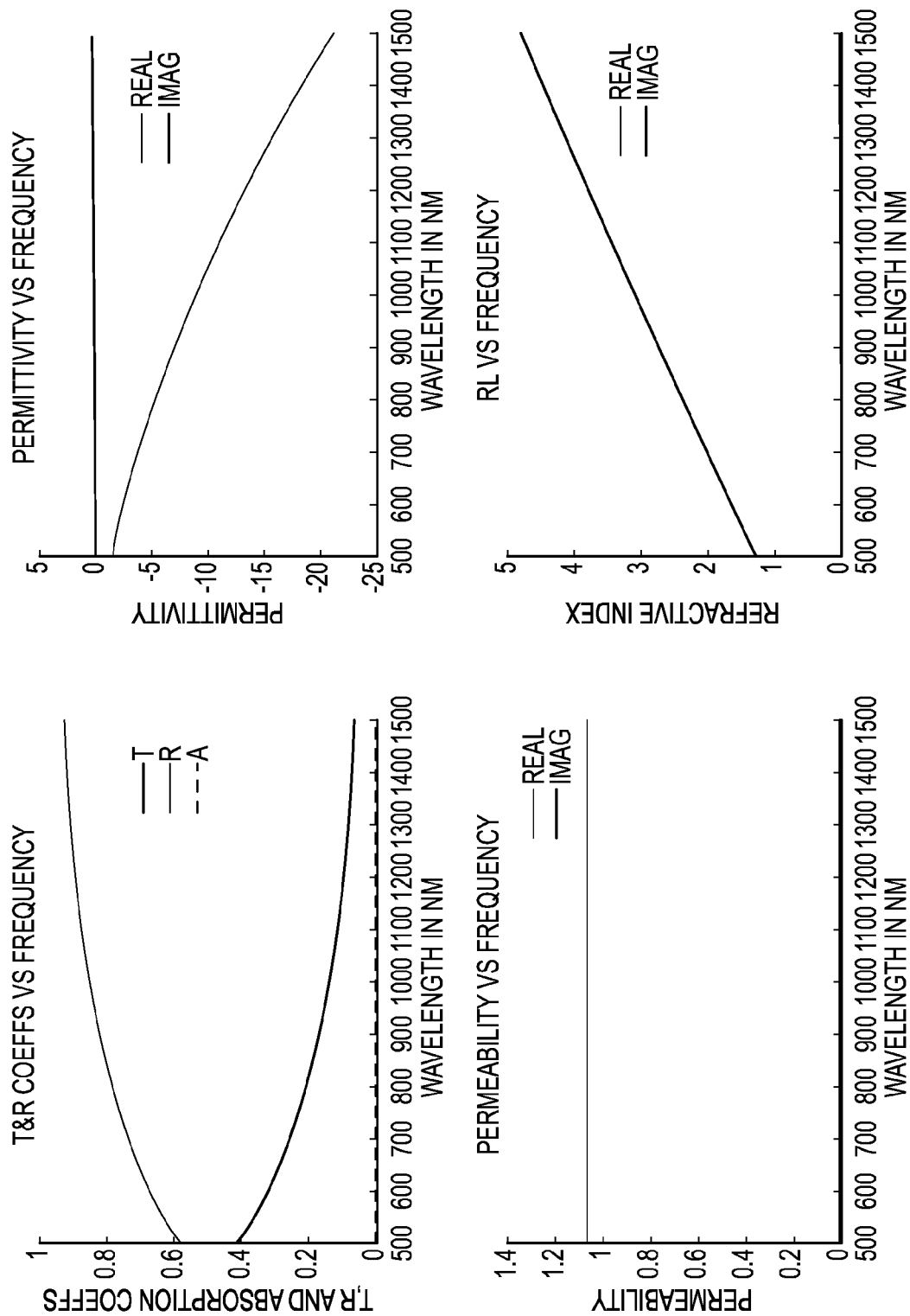
Figure 12D:
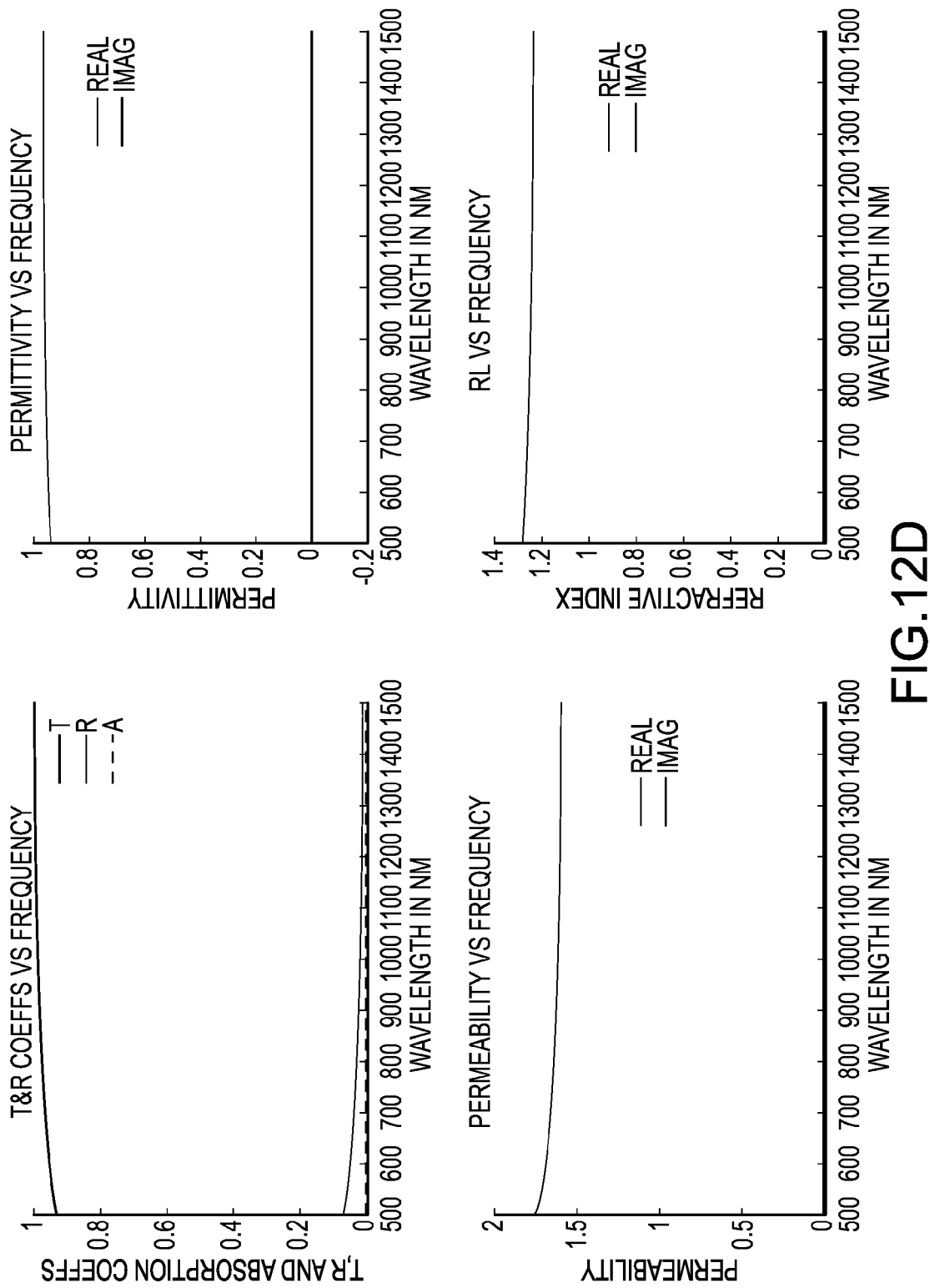

FIG. 11 is a 3-dimensional plot of the classical, antenna-like behavior of the embodiment of FIG. 7 with the optional inductive shunts 702, for the horizontal polarization. Unlike FIG. 9, the response of this configuration may be nonzero, though small, for this polarization. Thus, it should be understood that the use of the optional inductive shunts, while potentially advantageous for certain parameters, may introduce "crosstalk" between the two linear polarizations (also known in RF antenna design as "cross-polarization") and may thus reduce the efficiency of the metapolarizer.

FIGS. 12A-12D is a series of 2-dimensional graphs showing the effective parameters $\in_{\mathit{eff}}$, $\mu_{\mathit{eff}}$, and $n_{\mathit{eff}}$ for both the electric and magnetic fields of an incident photon for each polarization of light in the performance of the metamaterial from FIG. 7. The relationship between wavelength and the effective refractive index $n_{\mathit{eff}}$ for each of two perpendicular directions is different for photons of parallel and perpendicular linear polarization. One polarity experiences a birefringence magnitude $\Delta n$ of approximately 1.3 (see FIG. 12D), whereas the other experiences a birefringence magnitude of approximately 1.5 (see FIG. 12B). In terms of retardation, this situation can be described as a continuously varying, polarization-dependent anisotropy in the amount of rotation each photon experiences. If the difference in retardation between any two photons is equal to their difference in polarization azimuth, the result is a "perfect" metapolarizer. If the difference is equal to zero, the result is a conventional waveplate. In between there are various degrees of while both polarizations are rotated by the metamaterial, one is rotated more strongly. Therefore, the output photons will exhibit a strong polarization bias even when the input photons are randomly polarized. In other words, a metapolarization effect has occurred. In addition, the small imaginary values for $\in_{\mathit{eff}}$ and $\mu_{\mathit{eff}}$ show that the structure is minimally absorbing and therefore highly transmissive. Thus, achieving a particular amount of rotation differential between the two polarities (e.g., 90 degrees for an exemplary twisted nematic video display application) is a function of the number of layers of the planar metamaterial the photons pass through.

As the plots show, $n_{\mathit{eff}}$ may have a different value for the electrical and magnetic components of an incident photon, meaning the polarity of the photon may rotate in order to keep the electric and magnetic phases of the photon 90 degrees apart as required by Maxwell's equations. In addition, the difference in $n_{\mathit{eff}}$ between the electric and magnetic components may be larger for the vertical polarization than for the horizontal polarization, meaning the metapolarizer device may rotate one polarity more strongly than the other. In practical terms, these plots describe a metapolarizer that rotates one polarization approximately 15% more than the other, and thus increases total transmissivity to unpolarized or randomly polarized light by approximately 7%. Thus, the metapolarizer device may in principle be used, for example, to reduce the energy consumption of an LCD laptop display screen by approximately 7%.

Moreover, because the absorption of this structure may also be very low (i.e., the imaginary components of its permittivity and permeability may be close to zero), it may be practical to stack multiple layers of the planar metamaterial of FIG. 7 to produce staged rotation effects. In other words, two layers may produce a 30% metapolarization effect (and thus a 15% energy savings), six layers may produce a 90% and (and thus a 45% energy savings). Seven or more layers of this particular metamaterial may yield something close to 100% metapolarization (i.e., approximately 50% energy savings). However, it may be appreciated that in a device containing significant amounts of opaque, reflective, and translucent material, the overall transmissivity of such materials may drop as additional layers are added and, at some point (depending on the efficiency of the metapolarizer and the transmissivity of the materials comprising the metapolarizer), the transmissivity gains from the metapolarizer will be overtaken by the transmissivity losses from adding another layer. Thus, there may be a practical limit to the number of layers that will be used. An alternative approach may be to adjust the shape and spacing of the unit cells as described above to produce the desired $\in_{\mathit{eff}}$, $\mu_{\mathit{eff}}$, and $n_{\mathit{eff}}$ for each component of each polarity until the desired amount of metapolarization (e.g., approximately 100%) is achieved in a single layer.

Figure 13A:
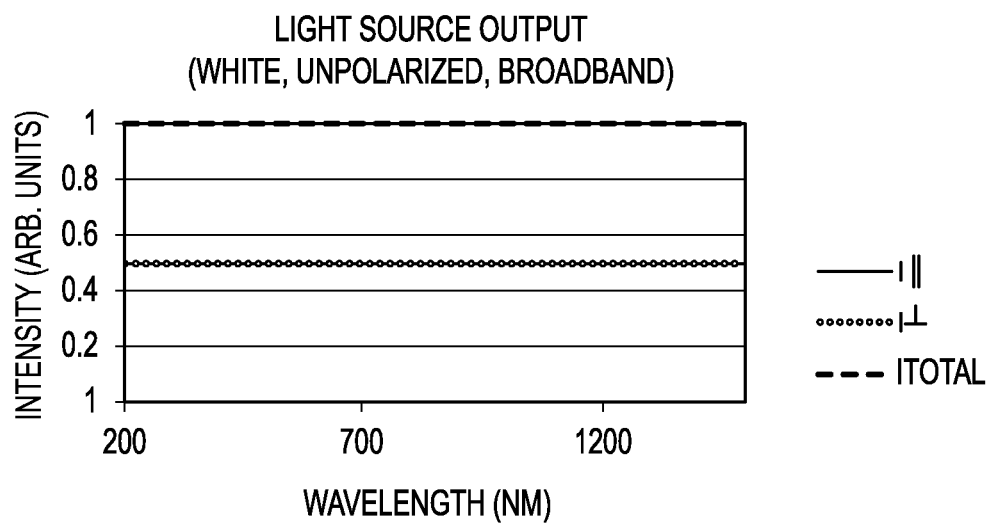
FIGS. 13A-13C are a series of 2-dimensional graphs showing the performance of an ideal light source, a standard polarizer, and a 100% efficient metapolarizer.
Figure 13B:
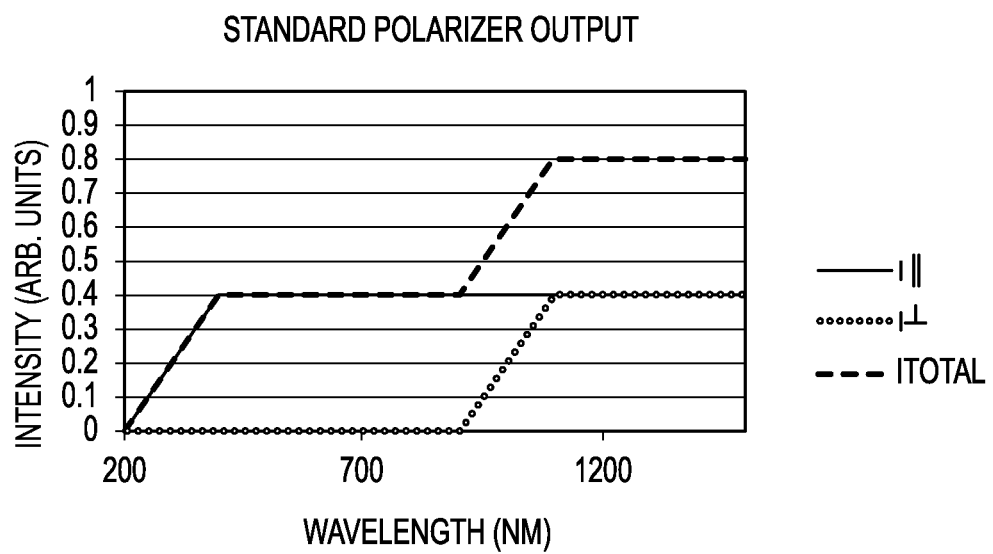
Figure 13C:
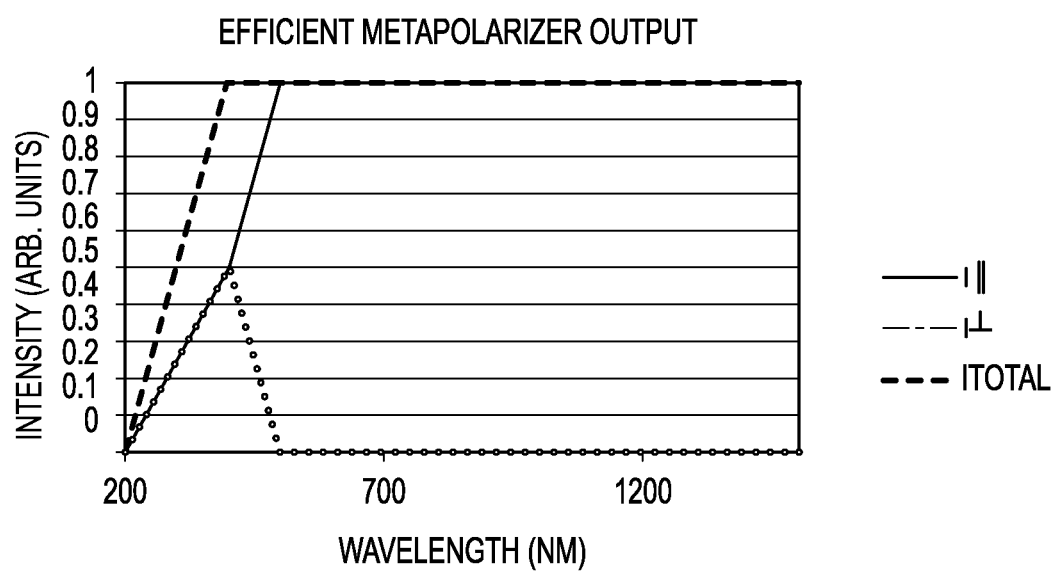

FIGS. 13A-13C are a series of 2-dimensional graphs included for clarity, showing the behavior of an ideal, non-polar light source, a standard optical polarizer of reflective, absorptive, or diffusive type, and a 100% efficient metapolarizer with a cutoff wavelength of around 400 nm. As the graphs show, the standard polarizer is only approximately 40% transmissive to unpolarized light, while the metapolarizer can approach 100% transmissivity. However, both devices transmit light of a single linear polarity. Thus, the metapolarizer is clearly superior for polarizing applications where efficiency, brightness, battery life or total energy flux are important.

Figure 14:
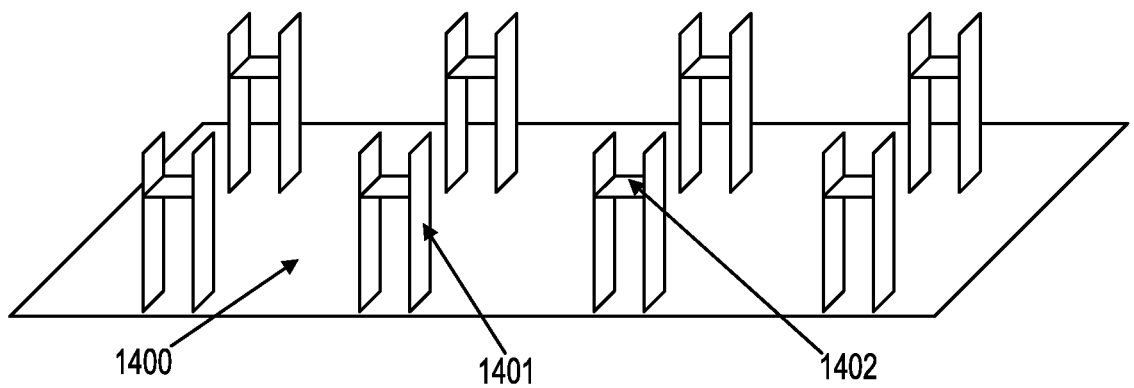
FIG. 14 is a schematic view of another embodiment of a metapolarizer incorporating transmission line unit cells oriented vertically on the dielectric substrate.

FIG. 14 is an isometric view of another embodiment of a metapolarizer, wherein the metamaterial may be composed of literal transmission line unit cells, oriented vertically on the dielectric substrate 1400 so that they may be capable of acting as waveguides for light striking the substrate 1400 at a perpendicular angle. Each unit cell consists of two metal strips 1401 separated by a dielectric (e.g., empty space) of thickness d. Depending on its height and thickness, each unit cell has a characteristic resonant frequency with known effects on the $\in_{eff}$ and $\mu_{eff}$ of the resulting metamaterial as described above. Feature sizes and performance of this embodiment may be generally similar to those shown in FIG. 7 and the metal strips may similarly be joined by an optional shunt inductor 1402.

Figure 15:
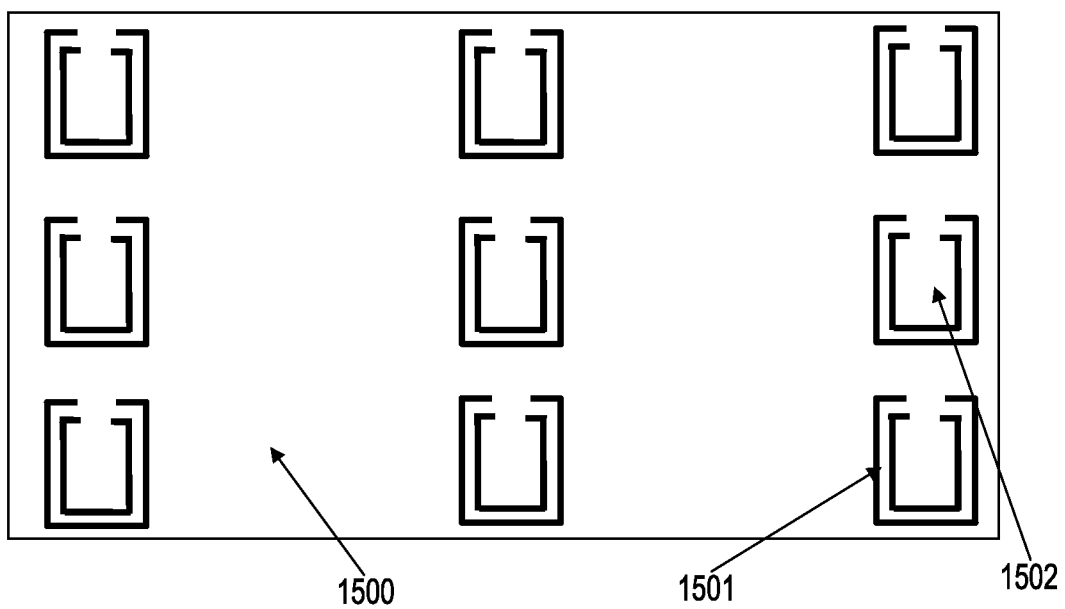
FIG. 15 is a schematic, top plan view of another exemplary embodiment of a metapolarizer, wherein the wire pairs of FIG. 7 are replaced with unit cells exhibiting symmetry across a vertical axis, but not horizontal or diagonal symmetry.

FIG. 15 shows another embodiment of a metapolarizer 1500, wherein the wire pairs of FIG. 7 may be replaced with elongated split-ring resonators 1501 around a dielectric gap 1502. These structures may allow a finer control over the $\in_{eff}$ and $\mu_{eff}$ of the metapolarizer through precise adjustment of the spacing between the two wires in the resonator (proportional to the series capacitance of an equivalent transmission line model), and of the length of the resonators (proportional to the shunt inductance). In general this structure may be much more inductive than the embodiment in FIG. 7, so care must be taken to keep the capacitance large enough to match the structure's equivalent impedance, at least approximately, to the 377 Ohms of free space. While the structure is symmetric around a vertical axis, the structure is neither horizontally nor diagonally symmetric and may thus exhibit a minimal capacity for electrons to resonate symmetrically in parallel portions of the unit cell. Rather, the resonant electrons may tend to move antisymmetrically, leading to the appearance of circulating current and thus a magnetic field, without the necessity for a strong electric field.

Numerous other unit cells may be substituted which may have this same property and in general these may be unit cells with symmetry along only one axis, possibly though not necessarily similar to the unit cells in FIG. 4, but with certain elements deleted, moved, or modified to remove symmetry around the horizontal axis. Completely asymmetric unit cells are also possible but may be computationally prohibitive and/or difficult to reproduce or manufacture.

When a metapolarizer is fashioned from such highly inductive unit cells, care may be taken to keep the capacitance large enough to match the equivalent impedance of the structure, at least approximately, to the 377 Ohms of free space. As the impedance of the structure for one polarity of light increases well above that of free space, the resulting impedance mismatch at the interface between the metamaterial and the free space (or other dielectric material) around it may cause a high coefficient of reflection for that polarity. In the degenerate case, where the resonators are infinitely tall, the structure may be 100% reflective to that polarity while having minimal effect on the perpendicular polarity, and may thus act as a wire grid polarizer rather than a metapolarizer.

Figure 16:
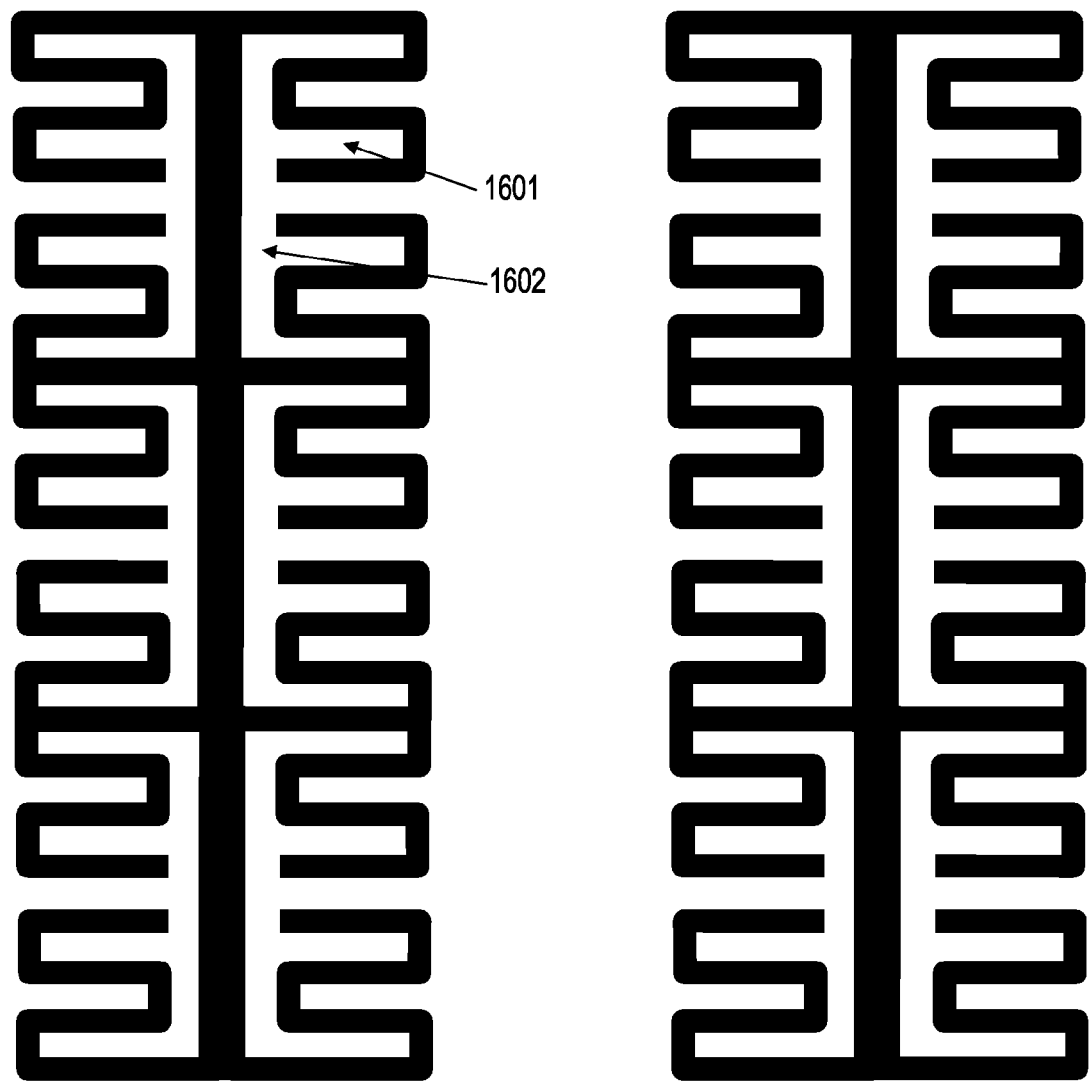
FIG. 16 is a schematic view of another exemplary embodiment of a metapolarizer using a space-filling curve antenna composed of roughened wire segments.

FIG. 16 is a schematic representation of an implementation of a metapolarizer in which negative-index planar antennas, similar to the ones in FIG. 1, have been arranged in columns. This structure is similar to that of FIGS. 7 and 15 in its effects, because the individual unit cells may have a metapolarizing effect. The total length of the horizontal capacitive gaps 1601 is exactly or approximately twice as large as the total length of the vertical capacitive gaps 1602 within the space-filling structure. Thus, one polarity of light sees a higher capacitance than the other, and thus a larger $\in$ and smaller $\mu$, which causes the unit cell to act as a metapolarizer as described above. In addition, the multiple feature sizes in both the horizontal and vertical directions may allow the total operating bandwidth of the metapolarizer device to be broader than for a simpler unit cell (e.g., the unit cells shown in FIGS. 3, 4, 7, and 14). This may be analogous to a fractal antenna, which may be thought of as a collection of quarter-wave antennas of various sizes, each responding to a different center wavelength.

In addition, the unit cells are arranged in a larger grating structure that has polarizing effects of its own, i.e., light of one polarity encounters a much larger number of unit cells than light of the other polarity. Thus, as with previous embodiments, light of one linear polarity encounters a significantly different $\in$ and $\mu$ than light of the other polarity, and the overall structure acts as a metapolarizer. It should be noted that when this structure is employed as a metapolarizer in the visible wavelengths, the width of each unit cell is less than one two-thousandth the width of the microwave antenna in FIG. 1—a substantial difference in scale from any prior art uses of that structure. Structures in this size range are only now becoming manufacturable using nanotechnology methods. For many applications it will also be desirable to form the metapolarizer structure from irregular nanowires rather than regular ones, in order to broaden the wavelength response even further, and also to diffuse any light reflected from the structure (e.g., to minimize glare).

In a more general sense, a reader of ordinary skill in metamaterials or antenna design will understand that complex unit cells exhibit fractal properties (i.e., multiple conductive segments of different sizes) that act to increase the bandwidth over which the unit cell can respond. Thus, the unit cells depicted in this figure can be thought of as "fractalized squares", and that increasing the fractal dimension of the unit cell while keeping its size constant may tend to broaden its response toward shorter wavelengths.

Figure 17:
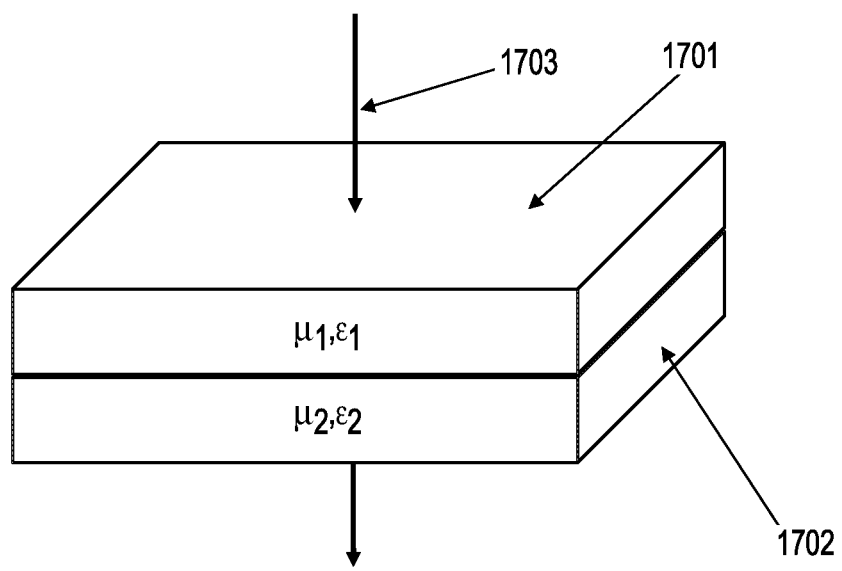
FIG. 17 is a schematic view of another exemplary embodiment of a metapolarizer, employing two or more layers of metamaterial.

FIG. 17 shows a schematic plan view of another exemplary embodiment of the present invention, wherein two separate layers of planar metamaterial on dielectric, 1701 and 1702, have been stacked. The two metamaterials 1701 and 1702 may be identical, or they may be slightly different versions of the same embodiment wherein the feature sizes have been adjusted to respond to different wavelengths, or they may be different embodiments. When a photon 1703 passes through the metamaterial layers 1701 and 1702, it may be rotated or unaffected according to its polarity based on the $\in$ and $\mu$ it encounters in each metamaterial layer. This structure may be useful, for example, in increasing the amount of rotation a photon of particular polarity is subjected to by passing the photon through multiple layers of metapolarizer. Alternatively, this multilayered structure could be used in an exemplary fashion to create a device that acts as a metapolarizer for one color of visible light in layer 1701 and for another color in layer 1702, while leaving the remaining visible spectrum unaffected. An arbitrary number of metamaterial layers may be stacked to produce a metapolarizer that operates over any desired wavelength range or ranges or, for example, to provide specific polarizations to various wavelengths.

Figure 18:
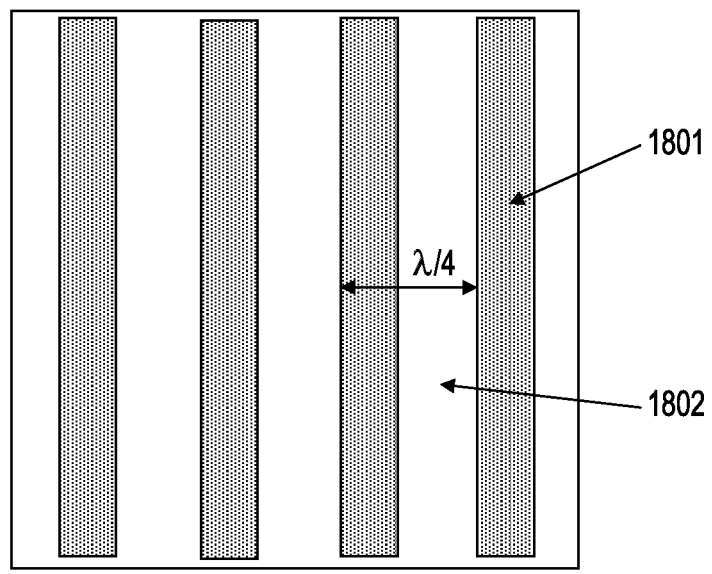
FIG. 18 is a schematic view of another embodiment of a metapolarizer, wherein strips of birefringent material with a sub-wavelength spatial frequency are used to create different values of birefringence for parallel and perpendicularly polarized photons.

FIG. 18 is a schematic representation of a further embodiment of the present invention, wherein strips, bars, or stripes 1801 of a transparent, birefringent material (typically a dielectric, although a metal meeting this description, if such exists, may also be employed), interleaved with non-birefringent gaps 1802, are employed to produce the metapolarizing effect. When a photon encounters a block or film of birefringent material, its polarity is rotated by an amount proportional to both the birefringence magnitude $\Delta n$ and the thickness d of the birefringent material. However, when the monolithic film of birefringent material is replaced with strips or bars (for example, by etching or nanoindenting portions of the film), the effective birefringence itself becomes a polarization-dependent quantity. When the spatial frequency of the bars is significantly less than a wavelength of light (e.g., $\lambda/4$ or less, although we do not wish to be bound by this as larger spatial frequencies may function nearly as well), and where the fraction of birefringent material "seen" by the photon is $f_1$ and the permittivity of the birefringent material is $\in_2$, and the fraction of non-birefringent material (whether free space, air, or some transparent filler material) is $f_2$ and its permittivity is $\in_2$, then the effective permittivity for a perpendicularly polarized photon $\in_\perp$ is found by $$\in_\perp = f_1 \in_1 + f_2 \in_2$$

and the effective permittivity for a parallel polarized photon $\in_\parallel$ is found by $$\frac{1}{m_{+\parallel}} = \frac{f_1}{m_{+1}} + \frac{f_2}{m_{+2}}$$

Thus, the optical anisotropy causes photons of differing polarity to "see" a different amount of birefringent material and therefore a different amount of rotation. A person of ordinary skill in the art will understand that the straight bars or lines 1801 of birefringent material could be replaced with non-straight lines or with fractal, space-filling lines, without altering the essential functioning of the embodiment.

A skilled reader may also observe that by some definitions this embodiment is technically a photonic material rather than a metamaterial, because it does not contain conductive, resonant (i.e., antenna-like) elements. However, for the purposes of this document the distinction is academic rather than functional, as the metapolarizing effect of this embodiment is equivalent to that of other embodiments.

Figure 19:
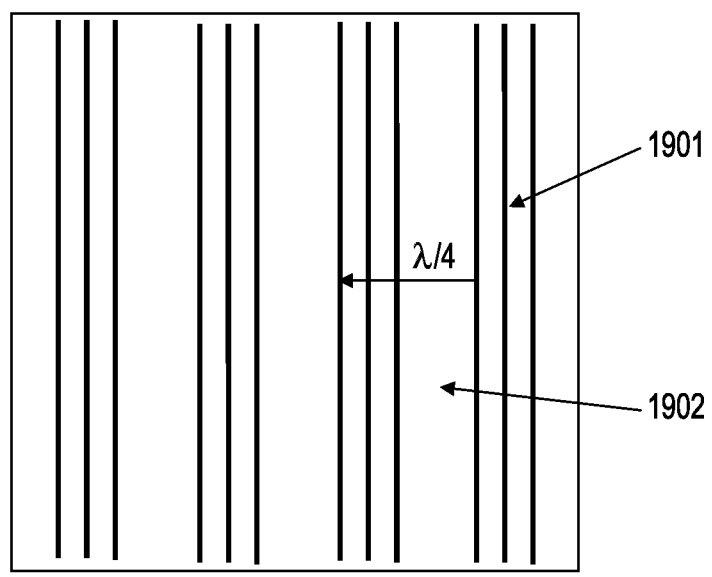
FIG. 19 is a schematic view of a further embodiment of a metapolarizer, wherein form birefringence replaces material birefringence in the birefringent strips.

FIG. 19 is a further embodiment derived from the previous embodiment, wherein the physical birefringence of the material is replaced with form birefringence in a non-birefringent material. In this case, each bar or strip 1801 has been replaced with a collection 1901 of even narrower strips 1902 which exhibit form birefringence according to the same permittivity relationship given above. As before, the gaps 1902 between the strips are of a non-birefringent material, although in this embodiment there is an additional requirement that the gaps 1902 be filled with a dielectric material (whether a solid, liquid, gas, or free space) having a significantly different index of refraction so that photons can "see" the bars as being distinct from the surrounding medium. As before, the straight lines may be replaced with non-straight lines, including fractal space-filling shapes, without altering the essential functioning of this embodiment.

Figure 20:
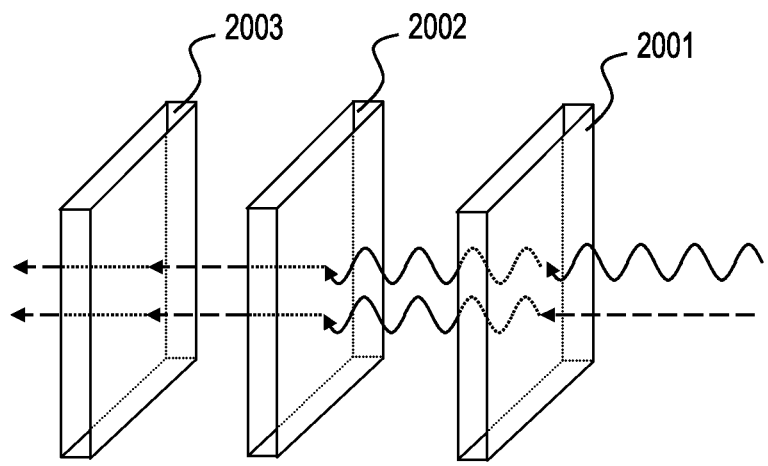
FIG. 20 is a schematic, plan view of an exemplary use of a metapolarizer, in a light shutter or video display pixel, in the bright or transmitting state.

FIG. 20 is a schematic representation of an exemplary use of the present invention, in which a metapolarizer 2001 is used in conjunction with a second standard polarizer 2003 and depolarizer 2002 (waveblock), as in a liquid crystal light shutter or video display pixel. In the figure, incoming light of matching polarity strikes the metapolarizer 2001 and is transmitted through. Light of opposite polarity strikes the metapolarizer 2001 and is retarded or rotated such that its polarity matches that of the metapolarizer 2001. In this implementation, the polarization output of the metapolarizer 2001 is of opposite polarization to the second polarizer 2003.

FIG. 20 depicts the operation of this embodiment in the transmissive state: the polarized light then enters the depolarizer 2002 (of which an exemplary form is a liquid crystal medium), which is in an organized state (e.g., a twisted nematic state) and thus functions to rotate the polarity of all the light passing through it since the light exiting the metapolarizer is of the same polarity, the rotation by the depolarizer matches the polarity of the second polarizer or analyzer, 2003, which is a standard reflective or absorptive polarizer.

Since the depolarized light matches the polarity of the second polarizer 2003, it is transmitted through. Therefore, in this embodiment the device is approximately 100% transmissive in the transparent state.

Figure 21:
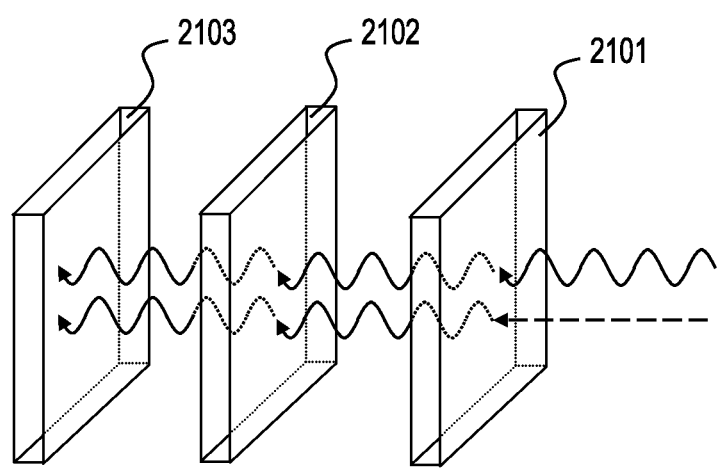
FIG. 21 is a schematic, plan view of an exemplary use of a metapolarizer in a light shutter or video display pixel in the dark or non-transmitting state.

FIG. 21 is a schematic representation of the same exemplary use as in FIG. 20, except that the embodiment is pictures in its opaque state. In this state, the depolarizer 2102 becomes disorganized (i.e., the liquid or isotropic state of a liquid crystal medium, or in the electrically aligned molecular state common in twisted nematic displays) and does not affect the polarity of the light passing through it. Therefore, since the light exiting the metapolarizer 2101 is of opposite polarity to the second polarizer 2103, approximately 100% of the light is absorbed or reflected back. Thus, the device is approximately 0% transmissive.

While several exemplary embodiments are depicted and described herein, it should be understood that the present invention is not limited to these particular configurations. Optional components such as coatings, films, spacers, fillers, ground wires, ground planes, or mechanical support structures may be added to suit the needs of a particular application or a particular manufacturing method, and degraded forms of some embodiments can be produced by deleting or substituting certain components. While several exemplary embodiments of the metapolarizer technology are depicted and described herein, it should be understood that the present invention is not limited to these particular configurations. Optional components such as coatings, films, spacers, fillers, or support structures may be added to suit the needs of a particular application or a particular manufacturing method, and degraded forms of some embodiments may be produced by deleting or substituting certain components, without departing from the spirit of the present invention. For example, the wires of a metamaterial could be fashioned from imperfect conductors or semiconductors, or from materials (e.g., copper) whose reflection spectra include substantial color anomalies in the wavelength region of concern.

The exact arrangement of the various layers can be different than is depicted here and, depending on the materials and wavelengths selected, different layers can be combined as single layers, objects, devices, or materials, without altering the essential structure and function of the invention. For example, any or all of the wires or wire segments in any of the embodiments described herein could be replaced with irregular wires or wire segments, in order to broaden the wavelength response and diffuse any reflections that result from an impedance mismatch with free space or with any other surrounding medium.

The implementations of the metapolarizer device as disclosed herein offer advantages that are not possible in the prior art. First, when used in conjunction with a normal absorptive or reflective polarizer, the metapolarizer may allow liquid crystal video displays, optical shutters, and thermoreflective or thermoabsorptive attenuators to have transmissivity approaching 100% in the transparent state. Second, the metapolarizer may be used to increase the brightness and/or reduce the power consumption of polarizing video displays. Third, the metapolarizer may be used in place of ordinary reflective or absorptive polarizers in applications including, but not limited to, for example, eyewear, telescopes, microscopes, cameras, sensors, building materials, video displays, projectors, and laser optics. Fourth, the metapolarizer may be used in place of conventional waveblocks in video displays and other optical applications, to rotate the polarity of incoming light.

All directional references (e.g., proximal, distal, upper, lower, upward, downward, left, right, lateral, front, back, top, bottom, above, below, vertical, horizontal, diagonal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A device for polarizing incident light over a broad bandwidth extending beyond a selected wavelength comprising
    a single layer of a transparent dielectric medium; and
    a plurality of separate structures of sub-wavelength conductive elements having dimensions smaller than the selected wavelength and supported on the dielectric medium in an array pattern spaced apart to avoid interference between adjacent structures to form a metamaterial; wherein
    the conductive elements form capacitive and inductive features that exhibit an effective permittivity and an effective permeability in each of the separate structures based on a size and an orientation of the capacitive and inductive features with respect to each other;
    the conductive elements are arranged axially within each of the separate structures such that the incident light of a first linear polarity encounters different capacitive and inductive features along a first axis of the device than the incident light of a second linear polarity encounters along a second axis of the device;
    the separate structures are arranged in columns parallel to the first axis and a first separation distance between adjacent separate structures within each column along the first axis is substantially smaller than a second separation distance between adjacent columns of the separate structures, and the first separation distance and the second separation distance are each less than the selected wavelength;
    the incident light with the first linear polarity encounters a first effective permittivity and a first effective permeability along the first axis in the device which does not significantly affect the incident light with the first linear polarity, whereby the device is transmissive to the incident light with the first linear polarity;
    the incident light with the second linear polarity encounters a second effective permittivity along the second axis having an absolute value that is larger than an absolute value of the first effective permittivity encountered by the light with the first linear polarity and an absolute value of a second effective permeability that is different than the absolute value of the first effective permeability encountered by the light with the first linear polarity in the structure; and
    an electric field of the incident light of the second linear polarity along the broad bandwidth extending beyond the selected wavelength is phase-shifted, thereby rotationally shifting the second linear polarity to a third linear polarity closer in orientation to the first linear polarity such that the broad bandwidth of the incident light rotated to the third linear polarity is transmitted through the device.

2. The device of claim 1, wherein the sub-wavelength conductive elements further comprise
    a grid of conductive dots arranged on the dielectric medium in a series of rows and columns, wherein
    a first spacing between conductive dots in adjacent columns is substantially one-half of a wavelength of incident light to be polarized; and
    a second spacing between conductive dots in adjacent rows is substantially one-sixth of the wavelength of incident light to be polarized; and
    a diameter of each of the conductive dots is substantially one-twentieth of the wavelength of incident light to be polarized.

3. The device of claim 2, wherein the conductive dots cover less than one-tenth of a total surface area of the dielectric medium.

4. The device of claim 2, further comprising a nanoscale wire placed adjacent to each column of the conductive dots that inductively couples the conductive dots in the column.

5. The device of claim 4, wherein the nanoscale wire is continuous.

6. The device of claim 4, wherein the nanoscale wire is discontinuous.

7. The device of claim 4, wherein the nanoscale wire has an irregular surface.

8. The device of claim 1, wherein the sub-wavelength conductive elements further comprise an array of unit cells that are symmetric along both a horizontal axis and a vertical axis, but are asymmetric along a diagonal axis.

9. The device of claim 8, wherein the unit cells are formed of nanowires having irregular surfaces.

10. The device of claim 8, wherein the unit cells are formed of discontinuous nanowires.

11. The device of claim 8, wherein the unit cells are formed as transmission lines oriented normally to the dielectric material.

12. The device of claim 1, wherein
    the sub-wavelength conductive elements further comprise a column array of negative-index, planar antennas having horizontal capacitive gaps and vertical capacitive gaps; and
    a total length of the horizontal capacitive gaps is substantially twice as large as a total length of the vertical capacitive gaps.

13. The device of claim 12, wherein the planar antennas are formed of nanowires having irregular surfaces.

14. The device of claim 12, wherein the planar antennas are formed of discontinuous nanowires.

15. The device of claim 1, wherein the sub-wavelength conductive elements further comprise a plurality of strips of transparent birefringement material arranged in parallel on the dielectric medium and spaced apart a distance substantially less than the selected wavelength of incident light.

16. The device of claim 15, wherein the distance is one-fourth or less of the wavelength of incident light to be polarized.

17. The device of claim 15, wherein the dielectric material has a significantly different index of refraction from the strips of transparent birefringement material whereby the strips have an effect on the incident light distinct from an effect of the dielectric medium.

18. The device of claim 15, wherein the strips of transparent birefringement material are arranged in parallel on the dielectric medium.

19. The device of claim 15, wherein the strips of transparent birefringement material are arranged as fractal, spade-filling shapes on the dielectric medium.

20. The device of claim 1, wherein the structure of sub-wavelength conductive elements creates a negative large second effective permittivity and a negative small second effective permeability.

21. The device of claim 1, wherein less than 50 percent of the incident light is reflected by the device.

22. The device of claim 1, wherein each separate structure comprises at least a pair of conductive elements spaced apart from each other along the second axis by between one-fourth and one-twentieth of the selected wavelength.

23. The device of claim 22, wherein each pair of conductive elements further comprises a pair of parallel nanowire segments having a length of substantially one-eighth of a wavelength of the incident light and a diameter defined by an aspect ratio of substantially 1:6.875 with respect to the length.

24. The device of claim 23, wherein the sub-wavelength conductive elements further comprise a plurality of nanowire shunt inductor segments respectively positioned between the nanowire segments in each of the parallel pairs of nanowire segments.

25. The device of claim 1, wherein the second separation distance is one-half the selected wavelength.

26. The device of claim 1, wherein the first separation distance is one-sixth the selected wavelength.

27. The device of claim 1, wherein the second separation distance is one-half the selected wavelength and the first separation distance is one-sixth the selected wavelength.

* * * * *